United States Patent
Ikenoue et al.

(10) Patent No.: US 9,716,712 B2
(45) Date of Patent: Jul. 25, 2017

(54) INFORMATION PROCESSING DEVICE, AND INFORMATION PROCESSING METHOD TO IMPROVE FACE AUTHENTICATION

(71) Applicant: Sony Computer Entertainment Inc., Tokyo (JP)

(72) Inventors: Shoichi Ikenoue, Tokyo (JP); Yoshihiko Suwa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/856,608

(22) Filed: Sep. 17, 2015

(65) Prior Publication Data

US 2016/0110588 A1   Apr. 21, 2016

(30) Foreign Application Priority Data

Oct. 15, 2014   (JP) ................. 2014-211057

(51) Int. Cl.

| G06K 9/00 | (2006.01) |
| H04L 29/06 | (2006.01) |
| H04N 5/232 | (2006.01) |
| G06K 9/03 | (2006.01) |

(52) U.S. Cl.
CPC ...... *H04L 63/0861* (2013.01); *G06K 9/00255* (2013.01); *G06K 9/00926* (2013.01); *G06K 9/03* (2013.01); *H04N 5/23219* (2013.01)

(58) Field of Classification Search
CPC ........... H04L 63/0861; G06K 9/00255; G06K 9/00926; G06K 9/03; H04N 5/23219
See application file for complete search history.

(56) References Cited

U.S. PATENT DOCUMENTS

| 2004/0208114 A1* | 10/2004 | Lao ................. H04N 5/23219 369/125 |
| 2007/0030381 A1* | 2/2007 | Maeda ................. G03B 13/36 348/345 |
| 2009/0175511 A1* | 7/2009 | Lee ................. G06K 9/00221 382/118 |
| 2013/0329106 A1* | 12/2013 | Bigioi ................. G03B 3/10 348/308 |

(Continued)

FOREIGN PATENT DOCUMENTS

WO   2007/050885 A2   5/2007

*Primary Examiner* — David F Dunphy
(74) *Attorney, Agent, or Firm* — Claire Zopf

(57) ABSTRACT

An information processing device includes: an image acquirer configured to acquire a shot image of a user from an imaging device; a registered user information holder configured to hold face identification data of a registered user; a face authentication section configured to execute authentication processing of a face image in the shot image by using the face identification data held in the registered user information holder; a shooting condition controller configured to adjust a shooting condition to bring a characteristic of the face image close to a characteristic of a face image of an acquisition source of the face identification data and make the imaging device perform shooting in order to improve an authentication result in the face authentication section; and an information processing section configured to execute information processing on the basis of an authentication result of a face image obtained by adjustment.

13 Claims, 12 Drawing Sheets

(56) References Cited

U.S. PATENT DOCUMENTS

| | | | |
|---|---|---|---|
| 2014/0193088 A1* | 7/2014 | Capata | G06K 9/00255 382/228 |
| 2015/0281576 A1* | 10/2015 | Yamada | H04N 5/23238 348/36 |
| 2016/0044228 A1* | 2/2016 | Kim | H04N 5/2258 348/345 |

* cited by examiner

7

114

INFORMATION PROCESSING DEVICE, AND INFORMATION PROCESSING METHOD TO IMPROVE FACE AUTHENTICATION

BACKGROUND OF THE INVENTION

Field of the Invention

The present disclosure relates to an information processing device that executes information processing by using a shot image, an information processing method thereof, and a computer program.

Description of the Related Art

In recent years, it is becoming general to equip a personal computer, a game machine, etc. with a camera and image the figure of a user to use the taken image in various forms. For example, systems in which an image of a user is transmitted to the other side as it is via a network, such as television telephone and video chat, and systems in which the motion of a user is recognized by image analysis and the recognized motion is used as input information of a game or information processing have been put into practical use (e.g. refer to WO 2007/050885 A2). Moreover, in recent years, it is becoming possible to realize games and image expression giving a user a more feeling of being present in the real world by detecting the motion of an object in a three-dimensional space including the depth direction with high accuracy.

In the case of shooting a space where a wide variety of objects exist and executing information processing with use of the shot image as input data, the accuracy of the information processing is more susceptible to the shooting environment and so forth compared with operation through buttons of an input device or a graphical user interface (GUI). Therefore, it is desired to realize a device that can execute stable information processing even when the environment changes. Particularly when an individual user is associated with the figure of the user in a shot image and an authentication is carried out at the time of login or the like, it is preferable that accurate associating is made with a small burden of the user.

RELATED ART LIST

WO 2007/050885 A2

SUMMARY OF THE INVENTION

There is a need for the present disclosure to provide a technique that allows execution of authentication processing with use of a shot image with a small burden of the user and stable accuracy.

According to an embodiment of the present disclosure, there is provided an information processing device. The information processing device includes an image acquirer configured to acquire a shot image of a user from an imaging device, a registered user information holder configured to hold face identification data of a registered user, and a face authentication section configured to execute authentication processing of a face image in the shot image by using the face identification data held in the registered user information holder. The information processing device further includes a shooting condition controller configured to adjust a shooting condition to bring a characteristic of the face image close to a characteristic of a face image of an acquisition source of the face identification data and make the imaging device perform shooting in order to improve an authentication result in the face authentication section, and an information processing section configured to execute information processing on a basis of an authentication result of a face image obtained by adjustment.

According to another embodiment of the present disclosure, there is provided an information processing method. The information processing method includes, by an information processing device, acquiring a shot image of a user from an imaging device, reading out face identification data of a registered user stored in a storage device and carrying out authentication of a face image in the shot image by using the face identification data, adjusting a shooting condition to bring a characteristic of the face image close to a characteristic of a face image of an acquisition source of the face identification data and making the imaging device perform shooting in order to improve an authentication result in the carrying out authentication, and executing information processing on a basis of an authentication result of a face image obtained by adjustment.

According to another embodiment of the present disclosure, there is provided a computer program for a computer. The computer program includes acquiring a shot image of a user from an imaging device, reading out face identification data of a registered user stored in a storage device and carrying out authentication of a face image in the shot image by using the face identification data, adjusting a shooting condition to bring a characteristic of the face image close to a characteristic of a face image of an acquisition source of the face identification data and making the imaging device perform shooting in order to improve an authentication result in the carrying out authentication, and executing information processing on a basis of an authentication result of a face image obtained by adjustment.

What are obtained by translating arbitrary combinations of the above constituent elements and expressions of the present disclosure among method, device, system, recording medium, computer program, and so forth are also effective as embodiment of the present disclosure.

According to the embodiment of the present disclosure, the accuracy of authentication processing with use of a shot image can be easily stabilized.

DETAILED DESCRIPTION OF THE PREFERRED EMBODIMENT

Figure 1:
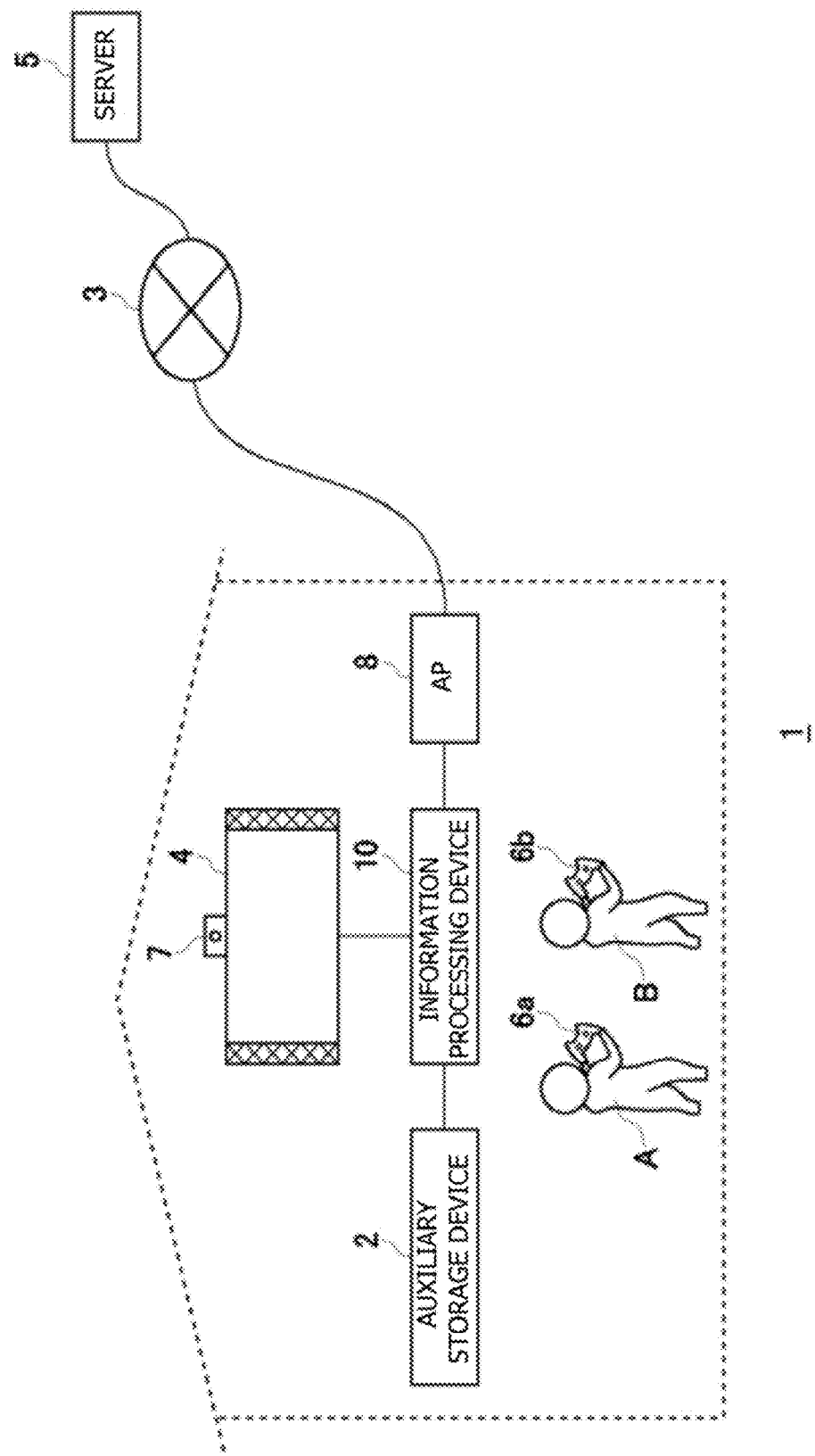
FIG. 1 is a diagram showing an information processing system in an embodiment of the present disclosure.

FIG. 1 shows an information processing system 1 according to an embodiment of the present disclosure. The information processing system 1 includes an information processing device 10 as a user terminal and a server 5. An access point (hereinafter, referred to as "AP") 8 has functions of a wireless access point and a router. The information processing device 10 connects to the AP 8 in a wireless or wired manner and communicably connects to the server 5 on a network 3.

An auxiliary storage device 2 is a high-capacity storage device such as a hard disc drive (HDD) or a flash memory. It may be an external storage device that connects to the information processing device 10 by a universal serial bus (USB) or the like or may be a built-in storage device. An output device 4 may be a television having a display to output images and a speaker to output sounds or may be a computer display. The output device 4 may be connected to the information processing device 10 by a wiring cable or may be wirelessly connected thereto.

The information processing device 10 connects to an input device 6 operated by a user in a wireless or wired manner and the input device 6 outputs an operation signal indicating an operation result by the user to the information processing device 10. When accepting the operation signal from the input device 6, the information processing device 10 reflects it in processing of an operating system (OS, i.e. system software) or an application and makes the processing result be output from the output device 4. The input device 6 has plural input parts such as plural push operation buttons, analog sticks with which an analog amount can be input, and pivotal buttons.

When accepting the operation signal from the input device 6, the information processing device 10 reflects it in processing of an application and makes the processing result be output from the output device 4. In the information processing system 1, the information processing device 10 is a game device that executes a game and each of the input devices 6a and 6b (hereinafter, often referred to as the input device 6 generically) is an apparatus, such as a game controller, to provide the operation signal of a user to the information processing device 10. The input device 6 may be an input interface such as a keyboard and a mouse. A camera 7 as an imaging device is provided near the output device 4 and images a space around the output device 4. Although an example in which the camera 7 is attached to an upper part of the output device 4 is shown in FIG. 1, it may be disposed at a side part of the output device 4. In any case, the camera 7 is disposed at a position at which it can image a user located in front of the output device 4. The camera 7 may be a stereo camera.

The server 5 provides network services to users of the information processing system 1. The server 5 manages network accounts to identify the respective users and each user signs in the network services provided by the server 5 by using the network account. By signing in the network services from the information processing device 10, the user can register, in the server 5, save data of a game and trophies as virtual prizes won in game play.

In FIG. 1, a situation in which two users A and B are operating the input devices 6a and 6b as game controllers is shown. The users A and B operate the input devices 6a and 6b, respectively, to input a passcode for login. After being authenticated by the information processing device 10, they log in to the OS of the information processing device 10 and thereby can enjoy an application such as a game.

In recent years, a game in which the motion of a user is reflected in the motion of a game character has also appeared. In a game utilizing gesture of a user, the user does not need to hold the input device 6 and can intuitively move a character. In such a game, because the user does not use the input device 6 in the first place, it is preferable that user authentication is executed without use of the input device 6 also when the user logs in to the OS of the information processing device 10. It is meaningful in the information processing system 1 that the user can log in through simple user authentication irrespective of the kind of game to be played by the user after the login. Therefore, in the information processing system 1 of the present embodiment, a technique by which user authentication can be easily executed by using a taken image by the camera 7 is provided.

Figure 2:
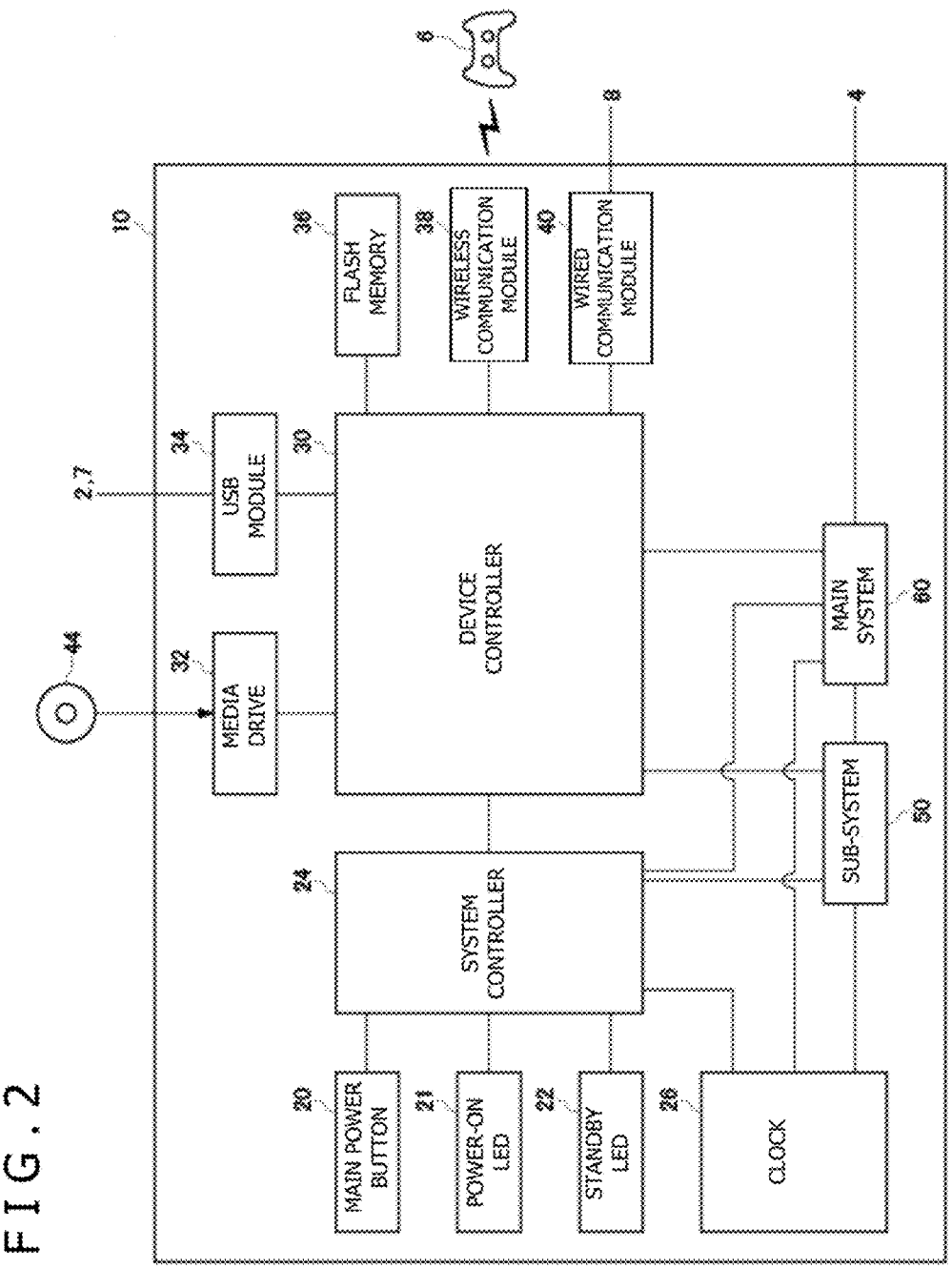
FIG. 2 is a diagram showing the internal configuration of an information processing device in the embodiment.

FIG. 2 shows the internal configuration of the information processing device 10. The information processing device 10 has a main power button 20, a power-ON light emitting diode (LED) 21, a standby LED 22, a system controller 24, a clock 26, a device controller 30, a media drive 32, a USB module 34, a flash memory 36, a wireless communication module 38, a wired communication module 40, a sub-system 50, and a main system 60.

The main system 60 includes a main central processing unit (CPU), a memory as a main storage device, a memory controller, a graphics processing unit (GPU), and so forth. The GPU is used mainly for arithmetic processing of a game program. These functions may be configured as a system on a chip and formed on one chip. The main CPU has functions to activate an OS and execute an application installed in the auxiliary storage device 2 under an environment provided by the OS.

The sub-system 50 includes a sub-CPU, a memory as a main storage device, a memory controller, and so forth and does not include a GPU. The number of circuit gates of the sub-CPU is smaller than the number of circuit gates of the main CPU and the operating power consumption of the sub-CPU is lower than that of the main CPU. The sub-CPU operates in a period during which the main CPU is in the standby state and its processing functions are limited in order to suppress the power consumption. The sub-CPU and the memory may be formed on different chips.

The main power button 20 is an input part to which an operation input from a user is made. It is provided on the front surface of a casing of the information processing device 10 and is operated to turn on or off power supply to the main system 60 of the information processing device 10. Hereinafter, that the main power supply is in an on-state means that the main system 60 is in the active state, and that the main power supply is in an off-state means that the main system 60 is in the standby state. The power-ON LED 21 is lit when the main power button 20 is switched on and the standby LED 22 is lit when the main power button 20 is switched off.

The system controller 24 detects pressing-down of the main power button 20 by the user. If the main power button 20 is pressed down when the main power supply is in the off-state, the system controller 24 acquires the pressing-down operation as an "on-instruction." On the other hand, if the main power button 20 is pressed down when the main power supply is in the on-state, the system controller 24 acquires the pressing-down operation as an "off-instruction."

The main CPU has a function to execute game programs installed in the auxiliary storage device 2 and a read-only memory (ROM) medium 44 whereas the sub-CPU does not have such a function. However, the sub-CPU has a function to access the auxiliary storage device 2 and a function to transmit and receive data to and from the server 5. The sub-CPU has only such limited processing functions and therefore can operate at relatively low power consumption compared with the main-CPU. These functions of the sub-CPU are executed when the main-CPU is in the standby state. Because the sub-system 50 is operating when the main system 60 is in the standby state, the information processing device 10 of the present embodiment keeps being in the sign-in state in the network services provided by the server 5.

The clock 26 is a real-time clock. It generates present date-and-time information and supplies it to the system controller 24, the sub-system 50, and the main system 60.

The device controller 30 is a large-scale integrated circuit (LSI) that carries out exchange of information among devices like a southbridge. As shown in the diagram, to the device controller 30, devices are connected, such as the system controller 24, the media drive 32, the USB module 34, the flash memory 36, the wireless communication module 38, the wired communication module 40, the sub-system 50, and the main system 60. The device controller 30 absorbs the differences in the electrical characteristics and the data transfer rate among the respective devices and controls the timing of data transfer.

The media drive 32 is a drive device that drives the ROM medium 44 that is loaded therein and in which application software such as a game and license information are recorded and reads out a program, data, and so forth from the ROM medium 44. The ROM medium 44 is a read-only recording medium such as an optical disc, a magneto-optical disc, or a Blu-ray (registered trademark) disc.

The USB module 34 is a module that connects to an external apparatus by a USB cable. The USB module 34 may connect to the auxiliary storage device 2 and the camera 7 by USB cables. The flash memory 36 is an auxiliary storage device forming an internal storage. The wireless communication module 38 wirelessly communicates with e.g. the input device 6 based on a communication protocol such as the Bluetooth (registered trademark) protocol or the IEEE 802.11 protocol.

The wireless communication module 38 may be compatible with a third generation digital mobile phone system that complies with the International Mobile Telecommunication 2000 (IMT-2000) standard defined by the International Telecommunication Union (ITU) and furthermore may be compatible with a digital mobile phone system of another generation. The wired communication module 40 communicates with an external apparatus in a wired manner and connects to the network 3 via the AP 8 for example.

In the information processing system 1 of the present embodiment, if the user presses down the main power button 20 when the information processing device 10 is in the power-off state, the information processing device 10 turns on the main power supply to activate the OS (system software) and execute login processing for the user. In this login processing, the information processing device 10 functions as a face authentication system using an image taken by the camera 7.

Figure 3:
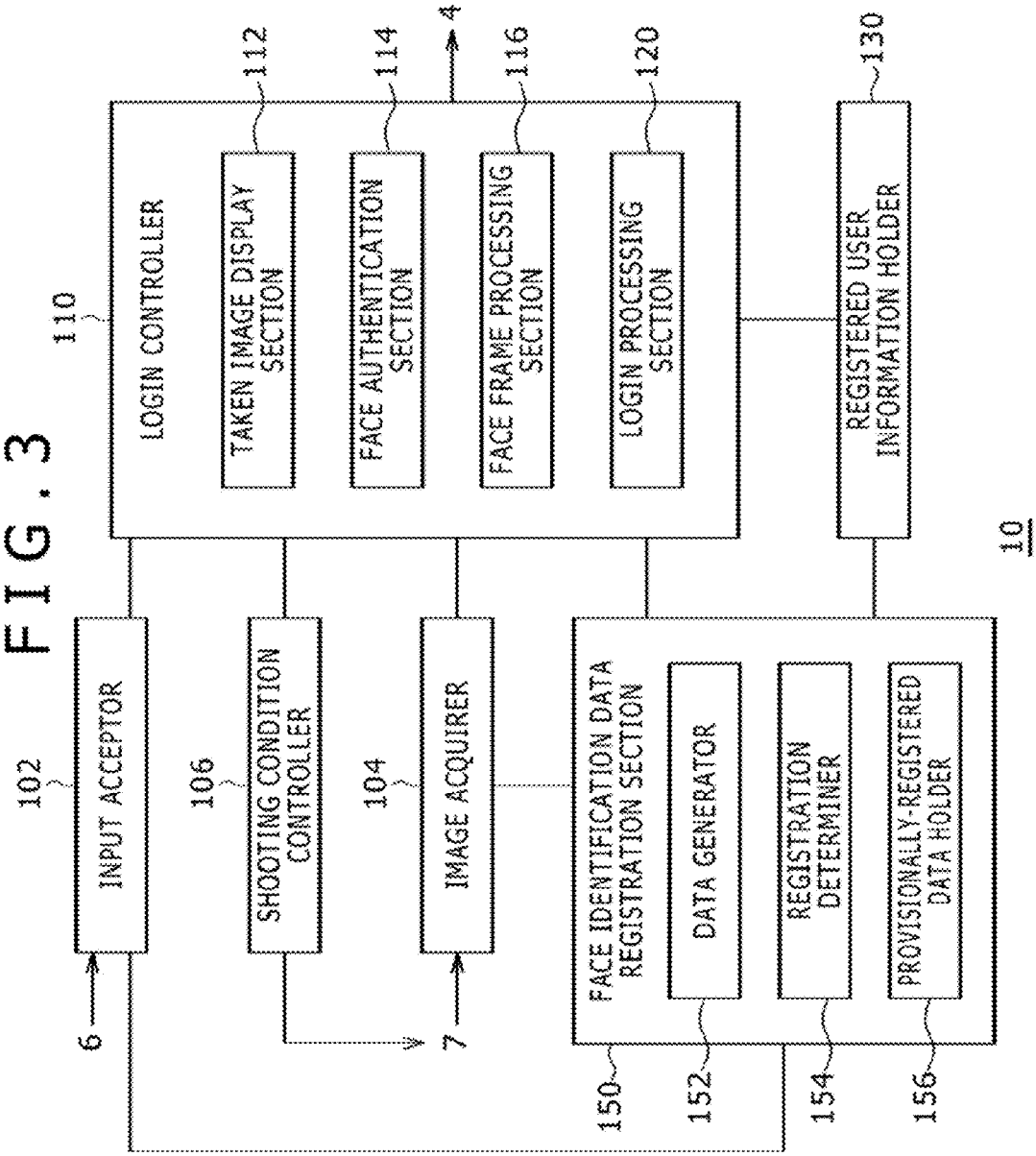
FIG. 3 is a diagram showing the functional block configuration of the information processing device in the embodiment.

FIG. 3 shows the functional block configuration of the information processing device 10. Although the information processing device 10 has a function to execute various kinds of information processing such as a game after the login processing, only functional blocks relating to the login processing including authentication are shown in FIG. 3. The information processing device 10 has an input acceptor 102, an image acquirer 104, a shooting condition controller 106, a login controller 110, a registered user information holder 130, and a face identification data registration section 150. The login controller 110 has a taken image display section 112, a face authentication section 114, a face frame processing section 116, and a login processing section 120. The face identification data registration section 150 has a data generator 152, a registration determiner 154, and a provisionally-registered data holder 156.

The respective elements described as functional blocks that execute various kinds of processing in FIG. 3 can be formed with circuit block, memory, and other LSIs in terms of hardware and are implemented by a program loaded into the memory and so forth in terms of software. Therefore, it will be understood by those skilled in the art that these functional blocks can be implemented in various forms by only hardware or only software or a combination of them, and they are not limited to any.

One of characteristics of the information processing device 10 of the present embodiment is that it assists simple login operation of the user. To log in to the OS of the information processing device 10, basically the user acquires a user account in advance and registers it in the information processing device 10. Hereinafter, the user who has registered the user account in the information processing device 10 will be referred to as the "registered user."

The input acceptor 102 accepts operation information from a user via the input device 6 and supplies this information to other functional blocks according to need. The image acquirer 104 acquires a taken image obtained by imaging by the camera 7 and stores it in a memory. The camera 7 shoots a spatial image at a predetermined cycle, specifically shoots one spatial image per 1/30 seconds for example, and provides the taken images to the image acquirer 104. The camera 7 is so disposed that its optical axis is oriented in the front direction of the output device 4, and thereby shoots a user who exists in front of the output device 4.

The login controller 110 extracts a region in which a face is captured in the shot image acquired by the image acquirer 104 and carries out a face authentication by using feature data of the face represented in this region. Then, if the authentication succeeds, i.e. if it is determined that the shot face is the face of a registered user, the login controller 110 allows this user to log in.

The registered user information holder 130 holds various pieces of information relating to the registered user. Specifically, it holds face identification data, the online identification (ID) (nickname on the network) of the user, a login passcode, and so forth as registered user information in association with the user account. The face identification data may be feature data of a face image of the registered user or face image data itself.

The face identification data is data employed as a comparison target in face authentication processing in the login controller 110. It is generated in accordance with an employed face recognition algorithm and is stored in the registered user information holder 130 by the face identification data registration section 150. For example, the face identification data may be data obtained by extracting, as characteristics, the relative positions and sizes of parts of a face and the shapes of eyes, nose, cheekbone, and jaw. Furthermore, the face identification data may be data representing the difference from an average face. In addition, it may be a statistic representing the distribution of the luminance vector and so forth. What kind of face identification data is to be extracted is determined by the employed face recognition algorithm.

The shooting condition controller 106 controls the shooting condition of the camera 7 so that a shot image at the time of login processing may get close to a shot image when face identification data held by the registered user information holder 130 is acquired. Specifically, the shooting condition controller 106 adjusts the shooting condition so that characteristics that change through the adjustment of the shooting condition, such as the luminance distribution and the frequency distribution, among various kinds of characteristics possessed by the shot image may get close to those of the shot image when the face identification data is acquired. This suppresses the deterioration of the authentication accuracy attributed to change in the shooting environment and so forth.

In the present embodiment, the functions of the taken image display section 112, the face frame processing section 116, and the face identification data registration section 150 are implemented by a face authentication application. The functions of the face authentication section 114 are implemented by a face recognition engine. They are automatically activated by the OS when the main power button 20 is pressed down. The face authentication application and the face recognition engine may be configured as one application.

First, an example of login processing to which the present embodiment can be applied will be described. However, the present embodiment can be applied to any technique of carrying out authentication by comparison between registered image data and a shot image and does not intend to limit its application range to the login processing to be described below. In this example, at least users A and B exist. The online ID of the user A is "HANAKO" and the online ID of the user B is "SACHIKO."

When the user presses down the main power button 20 of the information processing device 10, the main power supply of the information processing device 10 is turned on and the input acceptor 102 accepts information on the pressing-down of the main power button 20 as a login request from the user. The login request may be accepted via the input device 6. When the input acceptor 102 accepts the login request, the respective functions in the login controller 110 are implemented. The login controller 110 has a function to determine whether or not to permit login of the user on the basis of the result of face recognition of the user.

When the input acceptor 102 accepts the login request, the taken image display section 112 reads out a taken image acquired by the image acquirer 104 from the memory and displays it on the output device 4, which is a display. A live image shot by the camera 7 is thereby displayed on the output device 4, so that the user present in front of the output device 4 is displayed on the output device 4.

Figure 4:
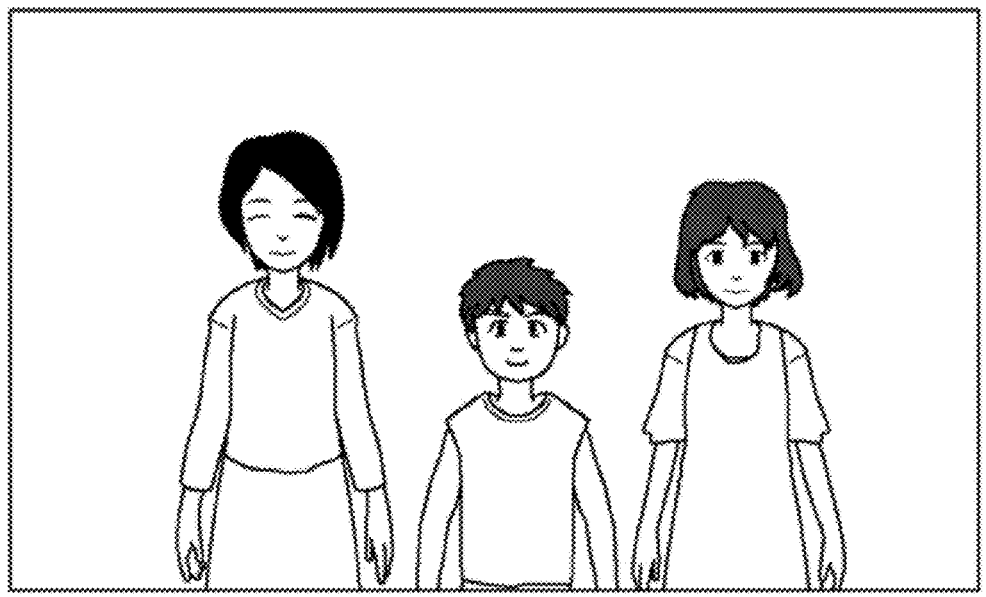
FIG. 4 is a diagram showing one example of a space shot by a camera in the embodiment.

FIG. 4 shows one example of the space shot by the camera 7. In this shot space, three users exist. A rectangular frame surrounding the users in FIG. 4 expresses the imaging range of the camera 7. The imaging range of the camera 7 defines the range displayed on the output device 4 as the live image but the live image may be part of the taken image. The face authentication section 114 extracts a part estimated to be a person's face in the taken image and derives feature data of this part. The face authentication section 114 then compares the derived feature data with face identification data held in the registered user information holder 130 and determines whether or not the extracted face is the face of a registered user.

Specifically, the face authentication section 114 derives the degrees of match between the feature data of the extracted face image of the user and the face identification data of all registered users held in the registered user information holder 130. This degree of match is numerically expressed. For example, the degree of match is derived in the form of a score out of 100. If the degree of match of a registered face image with the feature data surpasses a predetermined authentication threshold such as 90, the face authentication section 114 determines that the imaged user is a registered user and identifies which registered user the imaged user is.

If plural users whose degree of match surpasses the authentication threshold exist, the face authentication section 114 may determine that the imaged user is the registered user of the face identification data with which the best score is derived. If the face identification data whose degree of match surpasses the authentication threshold does not exist as the result of derivation of the degrees of match between the feature data of the face image of the user extracted from the taken image and the face identification data of all registered users, the face authentication section 114 determines that the user included in the taken image is not the registered user. By doing this, the face authentication section 114 executes the authentication processing by associating the face image in the taken image with the registered user with use of the face identification data held in the registered user information holder 130. In the present embodiment, this processing is positioned as a first-stage face authentication.

Figure 5:
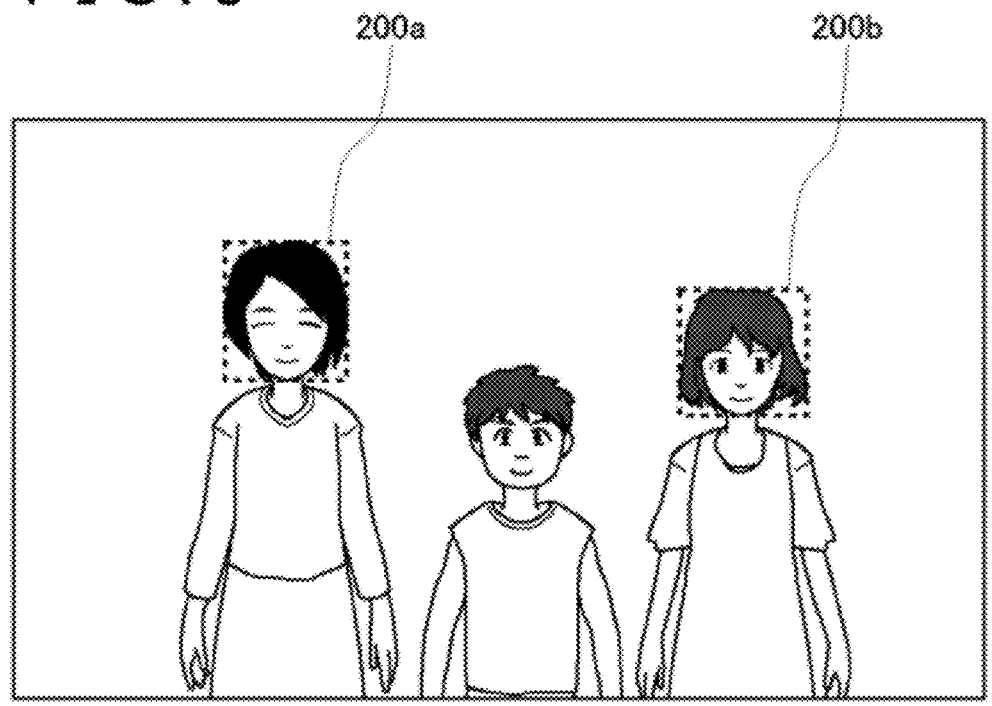
FIG. 5 is a diagram showing the result of face identification by a face authentication section in the embodiment.

FIG. 5 shows the result of face identification by the face authentication section 114. Here, it is determined that the left user is the user A and the right user is the user B and the middle user is not a registered user. The face authentication section 114 sets a face region 200*a* indicating the position of the face of the user A (online ID: HANAKO) in the taken image and a face region 200*b* indicating the position of the face of the user B (online ID: SACHIKO) in the taken image, and provides the face frame processing section 116 with information to identify the position coordinates of the face regions 200*a* and 200*b* and the imaged registered users.

Hereinafter, an example will be shown in which the position coordinates are expressed by two-dimensional coordinates when the taken image is displayed on the display. However, the position coordinates may be coordinates defined on a video random access memory (VRAM). In any case, it is enough that the coordinates of the face regions 200*a* and 200*b* (hereinafter, often referred to as the face region 200 generically) and the coordinates of face frames to be described later are expressed on a common coordinate system.

Each face region 200 may be set as a rectangular region in contact with the contour of the face in the taken image. Alternatively, it may be set as a rectangular region slightly wider than the facial contour. Here, the contour of the face means a contour including the head hair. However, the contour of the face may be set excluding the head hair if the head hair is not taken into consideration in face recognition processing of the face authentication section 114 for example. The size and shape of the face region 200 are determined by the size and shape of the face of the user in the taken image. Therefore, the size and shape of the face region 200 differ for each user. Furthermore, even for the same user, the size and shape of the face region 200 change depending on the distance from the camera 7.

The information that is provided from the face authentication section 114 to the face frame processing section 116 and is to identify the registered user may be the user account of the registered user or may be the online ID. The face authentication section 114 provides the face frame processing section 116 with the position coordinates of the face region 200 in association with the registered user identification information. Specifically, in the example shown in FIG. 5, the face authentication section 114 provides the face frame processing section 116 with a combination of the face region 200a and the identification information of the user A and a combination of the face region 200b and the identification information of the user B.

The face frame processing section 116 displays a face frame on the output device 4 for the registered user detected by the face authentication section 114. This face frame is displayed in order for the registered user to move the face and dispose it in the face frame when logging in. Therefore, the registered user is allowed to log in to the information processing device 10 by putting the user's own face in the face frame displayed on the output device 4.

Figure 6:
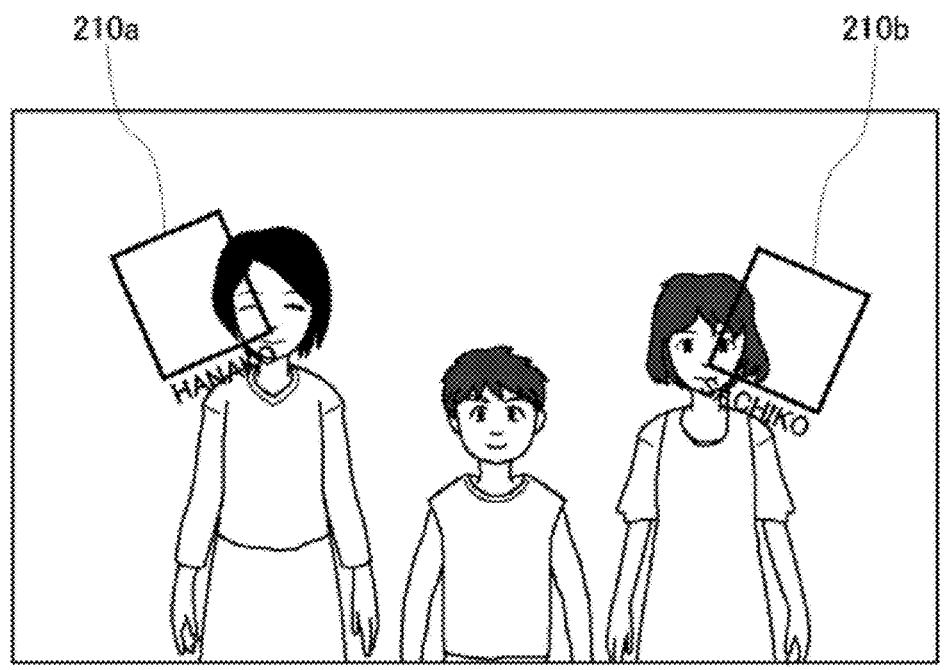
FIG. 6 is a diagram showing a login screen including face frames displayed on an output device in the embodiment.

FIG. 6 shows a login screen including face frames displayed on the output device 4. The face frame processing section 116 displays face frames 210a and 210b (hereinafter, often referred to as the face frame 210 generically) for registered users on the basis of the information that is provided from the face authentication section 114 and is to identify the position coordinates of the face regions 200a and 200b and the imaged registered users. In this example, the face frame processing section 116 displays the face frame 210a for the user A and displays the face frame 210b for the user B. At this time, the face frame processing section 116 displays the online ID of the user A near the face frame 210a and displays the online ID of the user B near the face frame 210b. This allows the users A and B to come to know that the own face is properly recognized and prompts them to move the face into the face frames 210a and 210b.

If an online ID different from the own online ID is displayed near the face frame 210 displayed near the own face, the user can come to know that the face recognition is not being properly carried out and therefore does not make action of putting the face in the face frame 210. Because the middle user is not a registered user, the face frame 210 is not displayed. However, in the case of recognizing an unregistered user as a guest user as described later, the face frame 210 for this user is also displayed in some cases.

The face frame processing section 116 gives an ID to each of the face frames 210 and provides the face authentication section 114 with face frame IDs, the position coordinates of the face frames 210, and the identification information of the users for which the face frames 210 are displayed. The position coordinates of the face frame 210 provided to the face authentication section 114 by the face frame processing section 116 may be the position coordinates of the face frame 210 itself or may be the coordinates of a rectangle circumscribed about the face frame 210. Hereinafter, the position coordinates of the face frame 210 itself and the position coordinates of a rectangle circumscribed about the face frame 210 will be referred to as the position coordinates of the face frame collectively. The position coordinates of the face frame are used to detect a face image of the user in the face authentication section 114.

For example, the face frame processing section 116 sets "ID1" as the face frame ID of the face frame 210a and sets "ID2" as the face frame ID of the face frame 210b. The face frame processing section 116 provides the face authentication section 114 with a combination of "ID1," the position coordinates of the face frame 210a, and the identification information of the user A and a combination of "ID2," the position coordinates of the face frame 210b, and the identification information of the user B. Furthermore, the face frame processing section 116 provides the login processing section 120 with the face frame IDs and the identification information of the users for which the face frames 210 are displayed. Therefore, in this case, the face frame processing section 116 provides the login processing section 120 with a combination of "ID1" and the identification information of the user A and a combination of "ID2" and the identification information of the user B.

Figure 7:
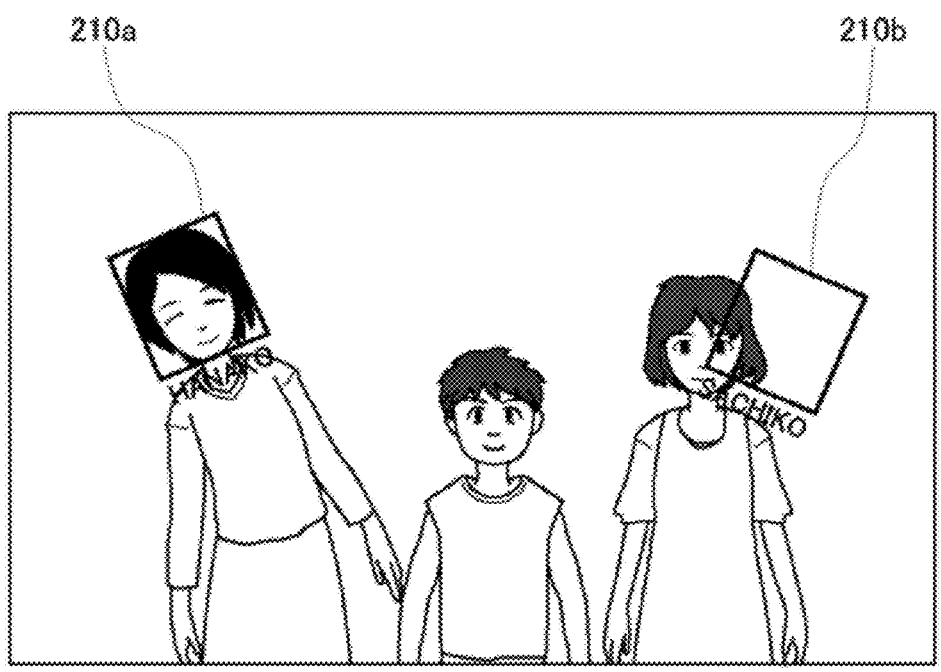
FIG. 7 is a diagram showing the login screen in which a user puts the face in a face frame in the embodiment.

FIG. 7 shows a login screen in which a user has put the face in a face frame. Here, a state is shown in which the user A has moved the face and body in such a manner that the face enters the face frame 210a displayed on the output device 4. The face authentication section 114 monitors whether a person's face is put in the face frame 210. If a face is put therein, the face authentication section 114 determines whether the face put in the face frame 210 is the face of the registered user by using face identification data held in the registered user information holder 130.

The face authentication section 114 can monitor whether a person's face is put in the face frame 210 on the basis of the position coordinates of the face frame 210 provided from the face frame processing section 116. The face recognition algorithm is as described above. When estimating that a person's face is included in the face frame 210, the face authentication section 114 derives the feature data of this part and compares the feature data with face identification data held in the registered user information holder 130 to determine that the extracted face is the face of the registered user.

The face authentication section 114 has been notified of the combination of the face frame ID, the position coordinates of the face frame 210, and the identification information of the user for which the face frame 210 is displayed from the face frame processing section 116, and compares the feature data of the face image of the person included in the face frame 210 with the face identification data of the user for which the face frame 210 is displayed. Because having been notified of the user that should be included in the face frame 210 in advance, the face authentication section 114 does not need to compare the feature data of the face included in the face frame 210 with the face identification data of all registered users and thus can efficiently execute the face recognition processing.

At this time, the face authentication section 114 may determine that the face of the registered user is put in the face frame 210 by detecting that the face of the registered user has been put in the face frame 210 for a predetermined time (e.g. several seconds). As a result, in the example of FIG. 7, the face authentication section 114 determines that the face that has entered the face frame 210a is the face of the user A. In the present embodiment, this processing is positioned as second-stage face authentication.

Through the first-stage and second-stage face authentications, the user authentication at the time of login ends. The action of putting a face in the face frame 210 by a user is made on the basis of the user's intention to log in. When the user does not desire to log in, the user does not need to put the face in the face frame 210. As above, in the present embodiment, the registered user who will possibly log in is detected by the first-stage face authentication and the registered user having an intention to log in is detected by the second-stage face authentication. The registered user is authenticated by only carrying out simple operation of putting the face in the face frame 210. Thus, the working burden on the user at the time of login can be made very small.

When detecting that the face of the user A has entered the face frame 210a, the face authentication section 114 notifies the login processing section 120 of the face frame ID to identify the face frame 210a and the user identification information to identify the user A. As already described, the login processing section 120 has been notified of the face frame IDs and the identification information of the users for which the face frames 210 are displayed from the face frame processing section 116 in advance. When being notified of the face frame ID and the user identification information from the face authentication section 114, the login processing section 120 extracts the user identification information associated with the face frame ID notified from the face frame processing section 116 and determines the match between the pieces of user identification information. Here, corresponding to the face frame ID of ID1, the identification information of the user A is notified as both of the pieces of identification information from the face authentication section 114 and the face frame processing section 116. Therefore, the login processing section 120 recognizes that the face of the user A is detected in the face frame 210a displayed for the user A. Due to this, the login processing section 120 allows the user A to log in to the information processing device 10.

In the above-described example, the face authentication section 114 compares the face identification data of the one user who should be included in the face frame 210 with the feature data of the face included in the face frame 210. However, the face authentication section 114 may compare the face identification data of all registered users with the feature data of the face included in the face frame 210. As a result, the face authentication section 114 often detects the face of a registered user other than the user A in the face frame 210a displayed for the user A. The face authentication section 114 notifies the login processing section 120 of the user identification information to identify the user included in the face frame 210 and the face frame ID, and the login processing section 120 compares them with the face frame ID and the identification information of the user for which the face frame 210 is displayed, notified from the face frame processing section 116 in advance.

If the identification information of the user for which the face frame 210 is displayed is different from the identification information of the user actually detected in the face frame 210 regarding the same face frame ID, i.e. if the face of a registered user other than the user A is detected in the face frame 210a displayed for the user A, the login processing section 120 determines that the face image detected in the face frame 210a is not the face image of the user A, and prevents the user A or the registered user who puts the face in the face frame 210a from logging in.

As described above, in the present embodiment, the login controller 110 causes a registered user to log in after carrying out the user authentication by face authentications of two stages. The first-stage face authentication and the second-stage face authentication may be concurrently executed at different cycles. For example, the first-stage face authentication and the second-stage face authentication are concurrently operated at a cycle of one second and a cycle of 1/60 seconds, respectively. Due to this, particularly when a large number of users exist at a time, the speed of the login processing can be enhanced compared to the case in which the face authentications of the two stages are executed one person by one person. By setting the operating cycle of the first-stage face authentication long and setting the operating cycle of the second-stage face authentication short as described above, transition from the first stage to the second stage can be rapidly made with a suppressed processing burden.

After login of one registered user through the second-stage face authentication processing, if a registered user who has not yet logged in is being shot, the login screen may continue to be displayed until this registered user logs in. In this case, it is preferable for the face frame processing section 116 to erase the face frame 210 displayed for the user who has logged in from the output device 4. If there is a limit that only one registered user is allowed to log in through this face authentication, transition to the home screen provided by the OS of the information processing device 10 or the like may be made after login of one registered user.

If the face authentication section 114 cannot detect a face in the face frame 210 for a predetermined time after the face frame 210 is displayed in the login screen, the login processing by face authentication may end and transition to login processing by use of the input device 6 may be made. Furthermore, if the user does not desire the login processing by face authentication, the login processing by face authentication may be ended by using the input device 6 for example and transition to login processing by use of the input device 6 may be made.

The face identification data used here differs depending on the face recognition algorithm employed by the face authentication section 114 as described above and may be either feature data or face image data itself. As one of face recognition algorithms, there is a method in which the degree of match is calculated on the basis of a difference image between a shot face image and a face image registered in advance and the distance from an eigenspace of a difference image group acquired in advance (refer to e.g. Japanese Patent Laid-Open No. 2002-157596).

Not only in this technique but in authentication based on a pixel value set, such as authentication in which block matching is performed between an image shot at the time of the authentication and a registered image and authentication in which probability density is obtained on the basis of the luminance distribution vector of an image with a statistic such as a covariance matrix, the face image as the source of the registered data readily affects the authentication accuracy. For example, possibly the overall luminance and the angle of light shining on a face greatly differ between an image shot under natural light incident from a window and an image shot under indoor illumination at night.

When these images are compared, the accuracy of derivation of the degree of match and hence the authentication accuracy tend to be low compared with when images shot under the same illumination environment are compared.

Such a change in the illumination environment is caused by various factors such as time zone, weather, whether a curtain is opened or closed, and which illumination lamp is lit. The authentication accuracy possibly changes due to change in not only the illumination environment but also the user oneself, such as the degree of facial swelling, aging change, whether make-up is done, and hairstyle.

If the authentication accuracy changes due to such external factors and a user has difficulty in being recognized or is recognized as another person even though being a registered user, the user is given a lot of stress. Not only that, possibly an inconvenience that information processing to be executed subsequently, such as a game, is not properly executed and so forth occur. Therefore, the information processing device 10 of the present embodiment suppresses the occurrence of the above-described problem by executing at least one of the following kinds of processing.
(1) automatic registration of face identification data
(2) adjustment of the shooting condition at the time of login
The respective kinds of processing will be described in detail below.

(1) Automatic Registration of Face Identification Data

To correctly identify a user through comparison with already-registered face identification data even when the shooting environment such as illumination or the user oneself changes, it is desirable to generate and register face identification data from images shot in as many states as possible. However, there is a limit to making of such states by the user oneself in practice. Therefore, in the present embodiment, pieces of face identification data are registered at proper timings determined by the information processing device 10 besides timings when the user oneself requests storing of face identification data. Thus, authentication processing that is less susceptible to the influence of aging change and situation change is implemented with small troublesome work of the user.

Figure 8:
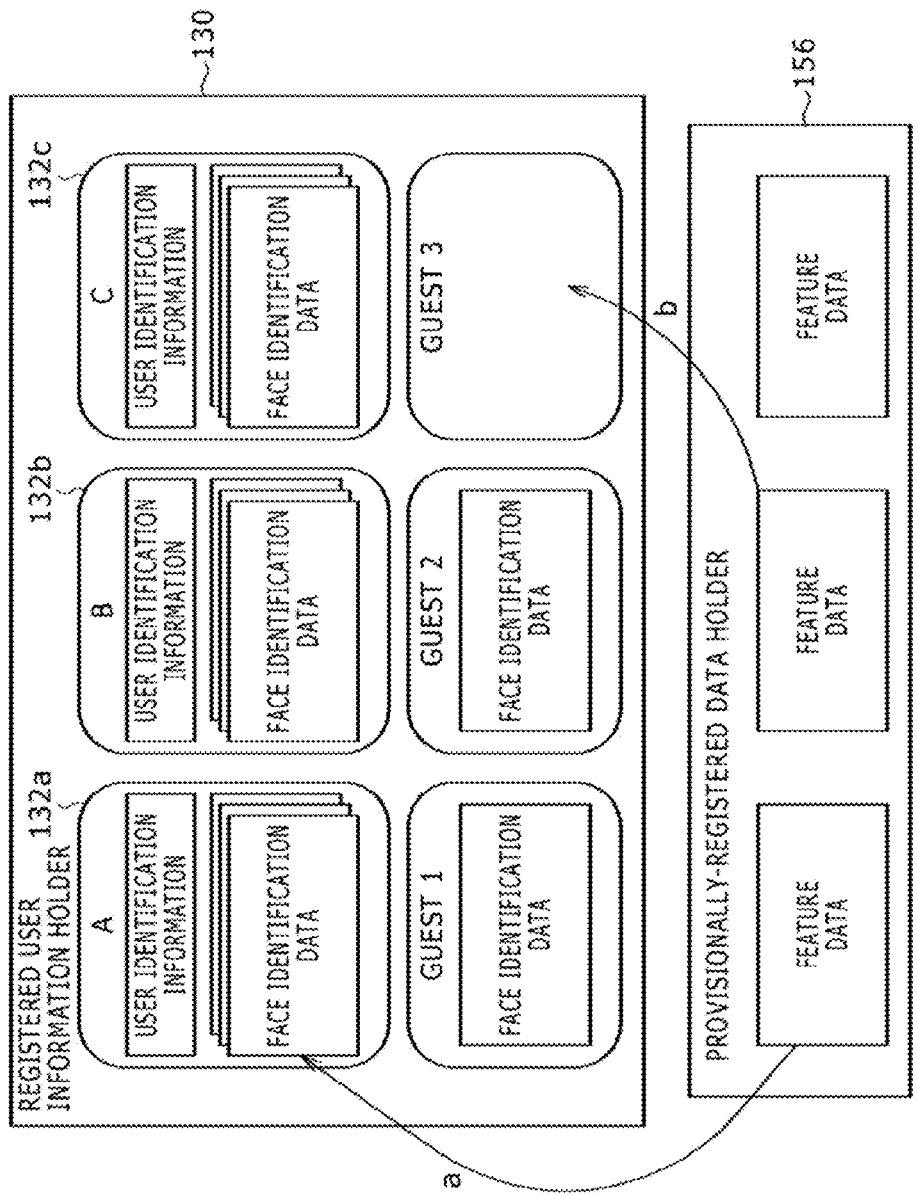
FIG. 8 is a diagram schematically showing data stored in a registered user information holder and a provisionally-registered data holder in the embodiment.

FIG. 8 schematically shows data stored in the registered user information holder 130 and the provisionally-registered data holder 156 of the face identification data registration section 150, shown in FIG. 3. Pieces of data to be used by the face authentication section 114 for authentication are stored in the registered user information holder 130. This data is one in which the "user identification information" of a registered user is associated with the "face identification data" as described above. FIG. 8 shows a state in which the "user identification information" and the "face identification data" are each stored in memory regions 132a, 132b, and 132c corresponding to users "A," "B," and "C."

In the example of FIG. 8, pieces of face identification data acquired at plural timings are shown by plural rectangles overlapping with each other. Qualitatively, the authentication accuracy becomes more stable when more pieces of data are accumulated. When first a new user requests user registration, the input acceptor 102 accepts this request via the input device 6 and notifies the face identification data registration section 150 of that effect. Meanwhile, the camera 7 starts shooting of the face of this user and the face identification data registration section 150 reads out data of a shot image acquired by the image acquirer 104 from a memory.

Subsequently, the data generator 152 extracts the region of the face from the shot image and derives feature data. In addition, the data generator 152 associates the feature data with user identification information such as a new online ID accepted by the input acceptor 102 from the user and an account given by the device and stores the associated data in a memory region newly ensured in the registered user information holder 130. Also when a user who has already completed user registration desires registration of face identification data at another timing after the user registration, similarly the data generator 152 extracts the region of the face from an image shot at this timing to derive feature data and store it in the registered user information holder 130 as the face identification data.

However, in this case, the face identification data is additionally stored in the corresponding memory region on the basis of user identification information identified in advance by login processing or the like. Such additional registration possibly occurs when the user oneself becomes aware of the necessity for registration due to the elapse of a certain amount of time from the previous registration or change in the state of the user for example.

In addition to these cases, the registration determiner 154 of the face identification data registration section 150 determines whether or not to additionally store face identification data by utilizing the timing when a user requests login and the login controller 110 executes the authentication processing for the login. Specifically, when the first-stage face authentication or the second-stage face authentication succeeds, i.e. when a newly-shot face image is identified as a face image of any registered user, feature data based on this face image is stored in the memory region of the identified user if this face image satisfies a predetermined condition.

In this case, the feature data that should be newly stored has been generated in the authentication processing by the face authentication section 114. Therefore, the data generator 152 may acquire this data from the face authentication section 114 and store it in the registered user information holder 130. Here, as the condition for the storing, the degree of match with the already-registered face identification data derived at the time of the authentication is utilized. For example, if the degree of match is equal to or higher than a predetermined value, additional registration of the relevant feature data is considered to provide little contribution to diversification of the face identification data and therefore this feature data is not stored.

If the degree of match is equal to or lower than a predetermined value, the possibility that the identified user is a different person is left and thus the feature data is not stored. Moreover, if comparison is made also with the face identification data of users other than the user identified as the result of the authentication and even one user that is different from the identified user and has the degree of match equal to or higher than the predetermined value exists, the possibility that the feature data is the data of this user is left and thus the feature data does not have to be stored. This makes it possible to collect face identification data with high reliability in various situations efficiently and continuously without forcing the user to do troublesome work, which stabilizes the authentication accuracy.

Furthermore, in the present embodiment, even though the first-stage face authentication and the second-stage face authentication do not succeed, the feature data of a face image obtained from a shot image at the time is not discarded but held and whether or not to register it is evaluated in the long term, to thereby make best use of the data obtained at the time of the login processing. For this purpose, the registration determiner 154 temporarily stores, in the provisionally-registered data holder 156, the feature data of a face image whose degree of match does not satisfy the condition for registration as face identification data. Hereinafter, temporarily saving feature data in this manner will be referred to as "provisional registration."

Thereafter, every time login processing is executed and a face image that has proven to be of high certainty as an image of a certain already-registered user through success in authentication or the like is obtained, the feature data thereof is checked also with the provisionally-registered feature data. The method of this check processing may be the same as the face authentication processing executed by the face authentication section 114. The registration determiner 154 stores, in the registered user information holder 130, feature data that satisfies a predetermined condition through plural times of check processing as face identification data to be used for authentication, to thereby carry out "formal registration" of this feature data. For example, if feature data that corresponds with the feature data of a face image of a specific registered user with high probability is detected, this feature data is formally registered as the face identification data of this user (e.g. arrow a).

Furthermore, feature data with which an event that this feature data does not correspond with the feature data of a face image of any registered user occurs with high probability is determined to be of high possibility to be the data of a user other than the registered users, and is stored in a memory region newly ensured in the registered user information holder 130 (e.g. arrow b). That is, the user corresponding to this feature data is considered to be not the registered user, about which user identification information has been registered, but be of high possibility to request login in the future. Therefore, this user is recognized as a guest user and the feature data thereof is formally registered as face identification data. In FIG. 8, such guest users are shown as "guest 1," "guest 2," and "guest 3."

Once a user is recognized as a guest user, subsequent processing is executed equivalently to the processing about the registered users. Specifically, at the time of login processing, the face authentication section 114 of the login controller 110 carries out authentication with use of the face identification data also about the guest user as well as the registered users. If a login object is authenticated as a guest user, the online ID displayed in the second-stage authentication like those shown in FIGS. 6 and 7 is represented as "guest 1," "guest 2," . . . or the like. Furthermore, the registration determiner 154 also checks the feature data of a face image about which authentication as a guest user has succeeded with the provisionally-registered feature data. As a result, if correspondence with one of the guest users occurs with high probability, this feature data is additionally formally registered as the face identification data of this guest user.

If the face identification data of a guest user has been stored in the registered user information holder 130, when a new user requests user registration, whether this user has been registered as the guest user is checked. Specifically, when the input acceptor 102 accepts the user registration request and the data generator 152 derives the feature data of this user from a shot image, the face authentication section 114 carries out a face authentication with the face identification data of the already-registered guest user and checks whether the face identification data whose degree of match surpasses the authentication threshold exists.

If the relevant data exists, the face authentication section 114 determines the registered face identification data as the data of this user and takes measures of associating this face identification data with newly-registered user identification information and so forth to delete the registration as the guest user. This prevents the occurrence of inconveniences that part of the data of a newly-registered user is left as data of a guest user and thus authentication is not correctly carried out and that face identification data automatically registered is not associated with the true user identification information.

Figure 9:
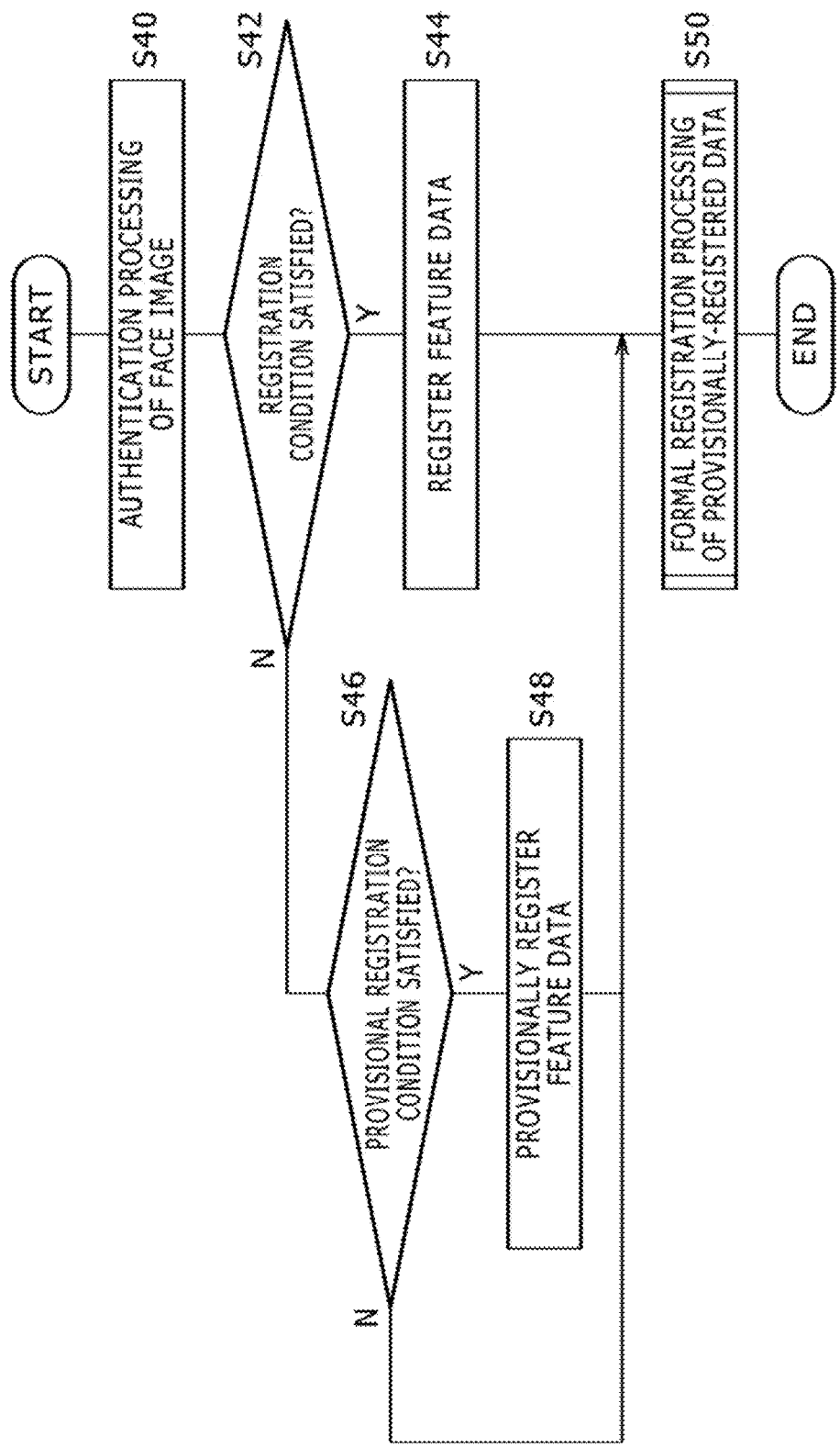
FIG. 9 is a flowchart showing the procedure of processing of registering face identification data by a face identification data registration section in the embodiment.

FIG. 9 is a flowchart showing the procedure of processing of registering face identification data by the face identification data registration section 150. This processing is started every time at least one of the first-stage face authentication and the second-stage face authentication is carried out in the login controller 110. At this time, the face authentication section 114 of the login controller 110 executes authentication processing of checking the feature data of a face region in a shot image with the already-registered face identification data stored in the registered user information holder 130 and identifying the corresponding user or guest user on the basis of the degree of match therebetween (S40). In the login controller 110, login processing is executed as appropriate on the basis of the result of the authentication processing.

Meanwhile, the registration determiner 154 of the face identification data registration section 150 acquires the feature data obtained from the face image and the authentication result from the face authentication section 114. If the authentication result satisfies the registration condition (Y of S42), the registration determiner 154 registers the feature data in the registered user information holder 130 (S44). Here, the authentication result includes not only success/unsuccess of the authentication but also the degrees of match with the face identification data of the respective users and the respective guest users. For example if the degree of match with the face identification data of a specific registered user falls within a predetermined range as described above, the feature data is registered in association with the user identification information of this user.

If the feature data of the shot image does not satisfy the registration condition in the determination of S42 (N of S42), subsequently whether or not the feature data satisfies a provisional registration condition is determined (S46). If the feature data satisfies the provisional registration condition (Y of S46), the registration determiner 154 provisionally registers the acquired feature data by storing it in the provisionally-registered data holder 156 (S48). Basically, the provisional registration condition is that the degree of match having a certain level or higher of possibility that the feature data corresponds to any user is obtained although the feature data does not have so high certainty as to be allowed to be directly registered as the data of a specific user.

If even the provisional registration condition is not satisfied, the feature data is stored in none of memory regions (N of S46). However, the feature data that does not satisfy the registration condition in S42 may be provisionally registered in the provisionally-registered data holder 156 without exception. In this case, the determination of S46 is omitted. In either case, consecutively the registration determiner 154 evaluates feature data stored in the provisionally-registered data holder 156 at the timing. Then, if the feature data that can be stored in the registered user information holder 130 exists, the registration determiner 154 formally registers it by storing it as appropriate (S50).

Figure 10:
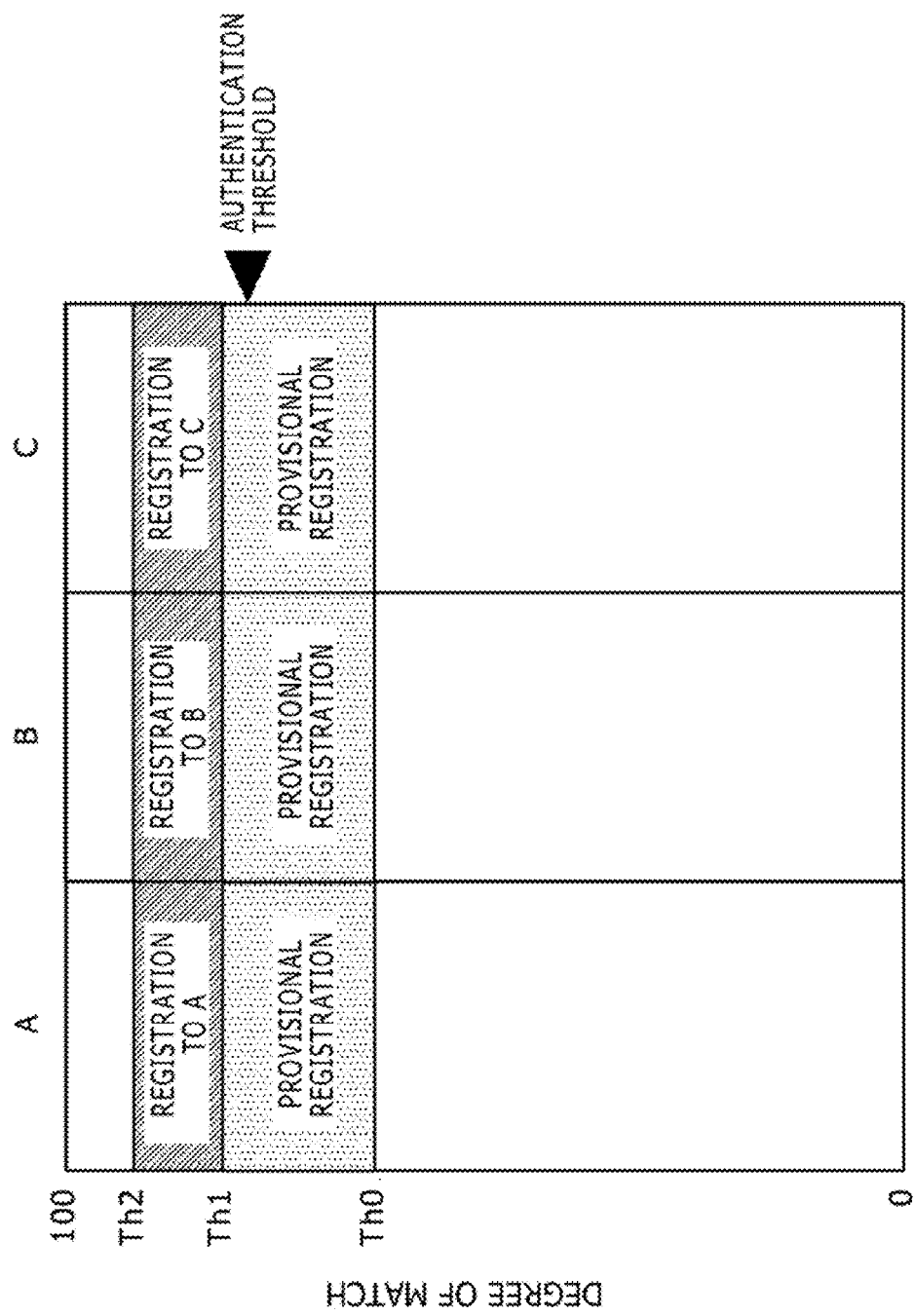
FIG. 10 is a diagram for explaining a setting example of a registration condition and a provisional registration condition in the embodiment.

FIG. 10 is a diagram for explaining a setting example of the registration condition and the provisional registration condition. Suppose that pieces of the face identification data of the users A, B, and C are registered in the registered user information holder 130. As described above, also when pieces of the face identification data of guest users are further registered, the guest users are treated similarly to the registered users. The face authentication section 114 checks the feature data of a newly-shot face image with the face identification data of each user and thereby calculates the degrees of match with the respective users.

Rectangles under the respective users "A," "B," and "C" in FIG. 10 represent the range of the degree of match in the vertical direction. The bottom side indicates 0 points as an example of the lowest degree of match and the top side indicates 100 points as an example of the highest degree of match. If plural pieces of face identification data exist about each user, the degrees of match may be individually calculated or the degree of match may be calculated on each user basis by statistical processing.

Qualitatively, if the degree of match with a specific user is high, the feature data is directly registered as the face identification data of this user. This corresponds to the "registration condition" in S42 of FIG. 9. However, as described above, newly storing feature data that is too close to the already-registered face identification data is considered to hardly contribute to improvement in the authentication accuracy. For this reason, in the example shown in FIG. 10, a lower limit Th1 and an upper limit Th2 are set as the registration condition given to the degree of match. For example, if the degree of match with the face identification data of the user A is from Th1 to Th2 inclusive, the feature data is registered as the face identification data of the user A.

However, with the exception of the case in which the feature data satisfies this condition regarding plural users, the feature data is not directly registered but provisionally registered once and thereby which user corresponds to this feature data is evaluated over time. Furthermore, the lower limit Th1 of the registration condition may be the same as the authentication threshold for determining authentication success in face authentication carried out by the face authentication section 114 or may be different. For example, by employing the degree of match higher than the authentication threshold as the lower limit Th1 of the registration condition as shown in FIG. 10, whether or not to register the feature data may be determined on the basis of the more strict criterion than that of the login processing.

Furthermore, if the degree of match that does not reach the lower limit Th1 of the registration condition but is close to it is obtained, that the degree of match is equal to or higher than Th0 and is lower than Th1 is regarded as the "provisional registration condition" in S46 of FIG. 9 as shown in FIG. 10 for example and the feature data is provisionally registered. At this time, the feature data may be stored in the provisionally-registered data holder 156 in the state in which the feature data is associated with none of users as shown in FIG. 8 or may be associated with an object user who satisfies the provisional registration condition. In the latter case, the degree of match may be checked only with the feature data of a face image of this associated user in subsequent evaluation. Furthermore, because long-term evaluation is made on the provisionally-registered feature data, feature data may be provisionally registered without exception even when plural object users who satisfy the provisional registration condition exist.

The registration condition and the provisional registration condition shown in FIG. 10 are one example and other various settings will also be available. For example, feature data having the degree of match lower than the lower limit Th1 of the registration condition as described above may all be provisionally registered. Alternatively, feature data whose degrees of match with all users are equal to or lower than a predetermined value may be further regarded as a provisional registration target. This is because such data can become a candidate for the face identification data of the above-described guest user.

Figure 11:
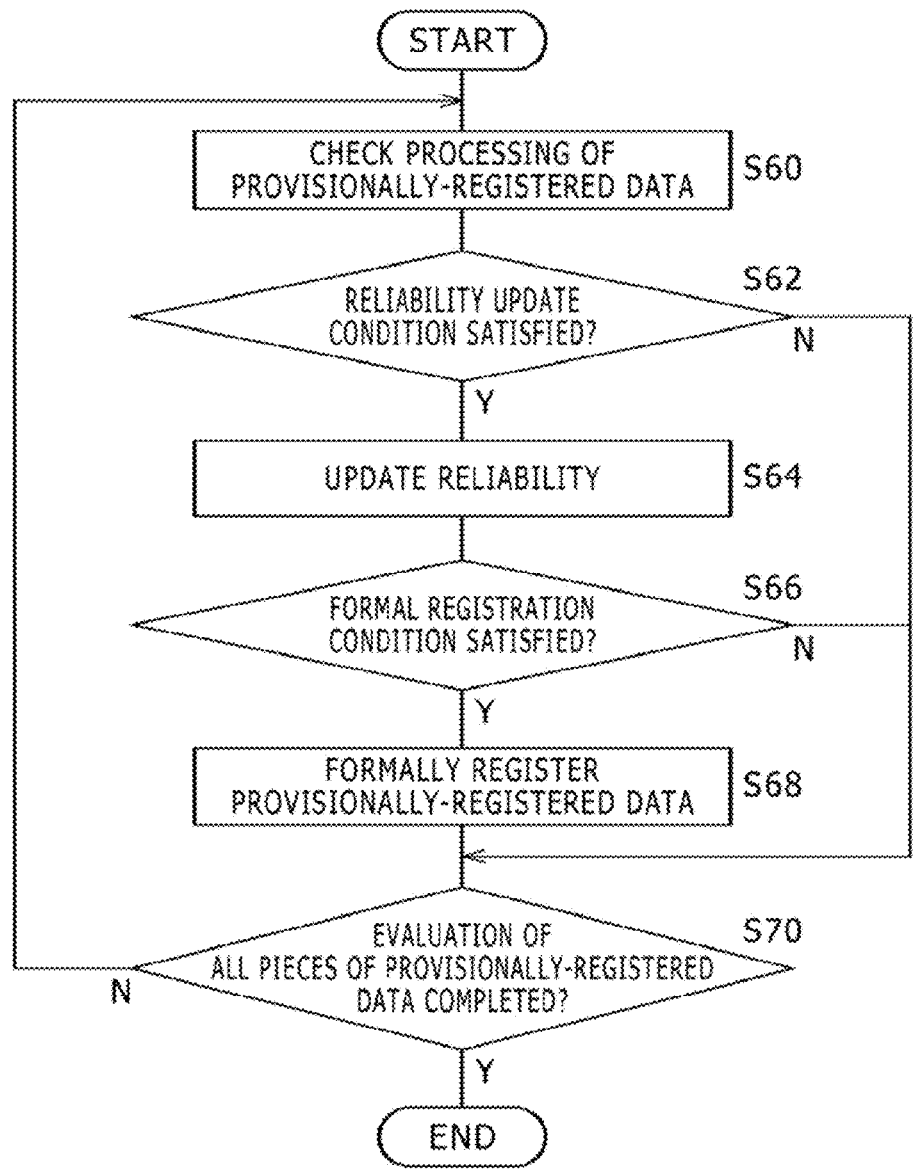
FIG. 11 is a flowchart showing the procedure of processing of formally registering provisionally-registered data by a registration determiner in the embodiment.

FIG. 11 is a flowchart showing the procedure of processing of formally registering provisionally-registered data by the registration determiner 154 in S50 of FIG. 9. First, the registration determiner 154 compares the feature data of a face image having a high possibility of being a face image of a specific user, such as a face image whose degree of match with already-registered face identification data is equal to or higher than a predetermined value, among face images shot and extracted in S40 of FIG. 9 with feature data stored in the provisionally-registered data holder 156, and calculates the degree of match (S60). The former face image may be identified under the same condition as the condition for success in authentication. Furthermore, this comparison processing may be similar to the processing of calculating the degrees of match between the feature data of a face image in a shot image and the face identification data of the respective users by the face authentication section 114 at the time of login processing.

Then, the registration determiner 154 determines whether or not a reliability update condition that the degree of match is equal to or higher than a predetermined value or is equal to or lower than a predetermined value is satisfied (S62). Here, the reliability is frequency representing the magnitude of the probability that the target feature data is the data of an already-registered user or a guest user or the magnitude of the probability that the target feature data is the data of none of the users, i.e. is the data of an unregistered user. For example, the reliability is represented by the number of times of satisfying of the reliability update condition. If feature data satisfies the reliability update condition (Y of S62), the registration determiner 154 updates the reliability of the relevant user or an unregistered user (S64).

After updating the reliability, the registration determiner 154 checks whether or not a formal registration condition is satisfied, specifically for example this reliability reaches a predetermined value (S66). If the formal registration condition is satisfied (Y of S66), the registration determiner 154 formally registers the feature data by storing it in the relevant memory region of the registered user information holder 130 (S68). If the reliability update condition is not satisfied in S62 (N of S62), the reliability does not change and therefore the determination of the formal registration condition is omitted. Such reliability update determination and determination about whether or not to allow formal registration are made about each piece of feature data (N of S70 and S60 to S68). When the evaluation is completed about all pieces of provisionally-registered feature data (Y of S70), the processing is ended.

Figure 12:
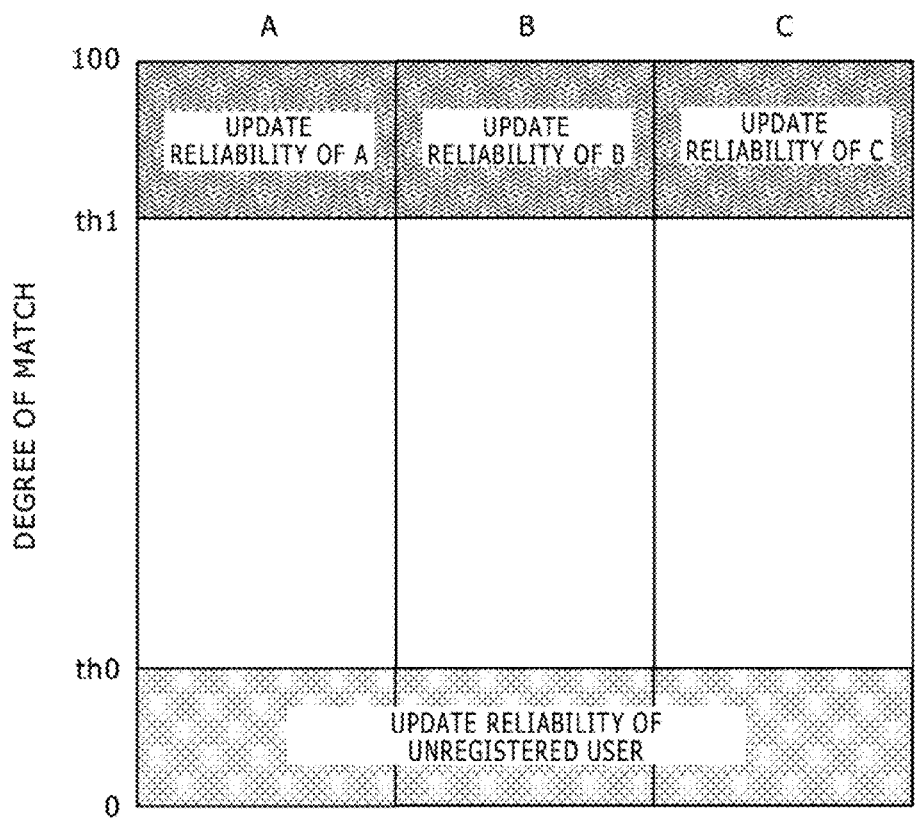
FIG. 12 is a diagram for explaining a setting example of a reliability update condition in the embodiment.

FIG. 12 is a diagram for explaining a setting example of the reliability update condition used in S62 of FIG. 11. Suppose that, similarly to FIG. 10, pieces of the face identification data of the users "A," "B," and "C" are registered in the registered user information holder 130 and the range of the degree of match with the feature data of a face image determined to be of high certainty as a face image of the user is represented by each rectangle. Also when guest users have been registered, the guest users are treated similarly to the registered users. As shown in FIG. 12, if the degree of match with the face image is equal to or higher than a threshold th1, it is determined that the reliability update condition is satisfied and the reliability corresponding to the user is updated. For example, if the degree of match with a face image determined as the user A is equal to or higher than the threshold th1, the reliability corresponding to the user A is updated. Furthermore, also when the degree of match with the face image is equal to or lower than a threshold th0, it is determined that the reliability update condition is satisfied. In this case, the reliability corresponding to the unregistered user is updated.

Figure 13:
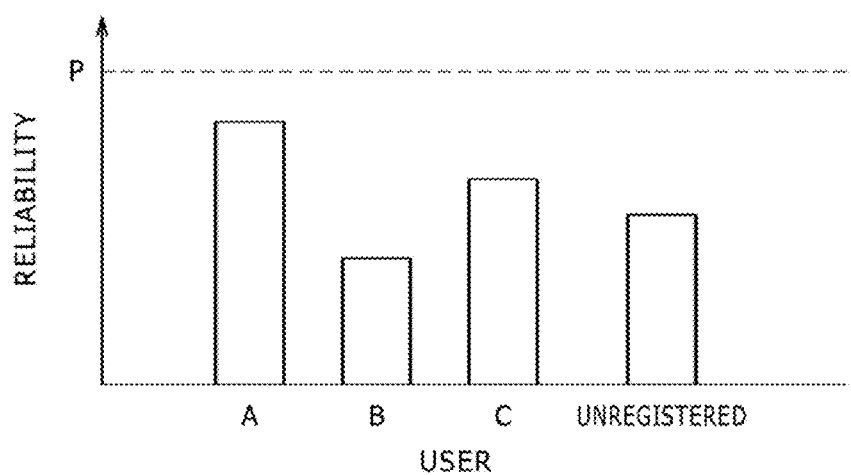
FIG. 13 is a diagram schematically showing a data example of reliability in the embodiment.

FIG. 13 schematically shows a data example of the reliability. The provisionally-registered feature data each holds the reliability corresponding to the respective users (users "A," "B," and "C") and the "unregistered user" as shown in FIG. 13. Furthermore, every time the reliability update condition like that shown in FIG. 12 is satisfied, the reliability of the corresponding user or the unregistered user is updated. At the timing when the reliability of any user reaches a predetermined value P, the feature data is formally registered as the face identification data of the corresponding user or a new guest user. In the case of FIG. 13, the reliability is shown as a parameter that becomes higher when the possibility that the feature data is the data of the corresponding user is higher. However, this does not intend to limit the characteristics of the reliability thereto.

Due to the above configuration, the feature data of a face image whose registration is avoided because of low certainty at the time of shooting can also be given opportunities to be used by being formally registered depending on the subsequent evaluation result. In particular, the pieces of the face identification data stored in the registered user information holder 130 are updated at any time by the above-described automatic registration processing and so forth. Therefore, there is a possibility that the reliability rises by continuously evaluating the feature data by utilizing the authentication processing and the feature data is registered. Furthermore, by evaluating provisionally-registered data on the basis of a shot face image, the reliability of the data falling within the allowable range of the degree of match can be properly updated even when the already-registered face identification data do not change.

As a result, a situation in which data is not registered due to temporary change in the shooting environment or slight difference attributed to noise or the like can be avoided. In addition, it becomes possible to continuously register high-accuracy data obtained by adding changes over a comparatively-long period, such as the growth and appearance change of the user oneself. Furthermore, by permitting a guest user, provided that feature data does not correspond with any registered user in the long-term evaluation, and registering the feature data, the possibility that an unregistered user is erroneously recognized as any of the registered users in subsequent login processing can be made low.

Feature data in which the frequency of satisfying of the reliability update condition is low and the reliability of any user does not reach the predetermined value P even after the elapse of a predetermined period may be deleted from the provisionally-registered data because the possibility that the feature data is unsuitable for registration due to the existence of a defect in the data itself is high. For example, an upper limit may be set in the number of pieces of feature data that can be provisionally registered. Furthermore, when the number of pieces of provisionally-registered feature data reaches the upper limit, feature data that has gone through a long period from its provisional registration and has a large difference between the reliability and the predetermined value P may be discarded and new feature data may be stored. Thus, the memory capacity of the provisionally-registered data holder 156 can be made limited.

(2) Adjustment of the Shooting Condition at the Time of Login

In the case of comparing registered face identification data with the feature data of a face image obtained at the time of login in the face authentication processing described thus far, if the shooting environments of the respective images are different as described above, it may be impossible to obtain the degree of match surpassing the authentication threshold even though these images are images of the same user attributed to difference in the image characteristics such as the luminance distribution. Furthermore, if the authentication threshold is lowered in consideration of such a situation, correspondence with a different user is readily caused.

In many cases, a general camera has a function to automatically adjust the shooting condition (including the correction condition) such as the exposure, the diaphragm, the gamma value, and the white balance so that the optimum shot image may be obtained according to the illumination environment of the moment and so forth. For example, a technique is prevailing in which the appearance of an image is improved and the accuracy of detection of a target object is improved by functions of auto exposure, auto gain control, and so forth. However, such functions are intended to adjust the overall balance on each image basis and therefore do not effectively work for the above-described face authentication, which is premised on comparison of a partial region between two images. On the contrary, possibly these functions increase the difference in the image characteristics and cause adverse effects.

Therefore, the shooting condition controller 106 of the information processing device 10 controls the shooting condition of the camera 7 so that the image characteristics of a face image shot at the time of login processing may get close to the image characteristics of a face image as the source of registered face identification data. At this time, if the face image itself is employed as the face identification data, the image characteristics of this image may be employed as the target. If data other than the shot image, such as the shapes and sizes of parts of the face and difference from an average face, is employed as the face identification data, data relating to the image characteristics of the original face image is saved in the registered user information holder 130 in addition to the face identification data and is read out at the time of the adjustment.

Figure 14:
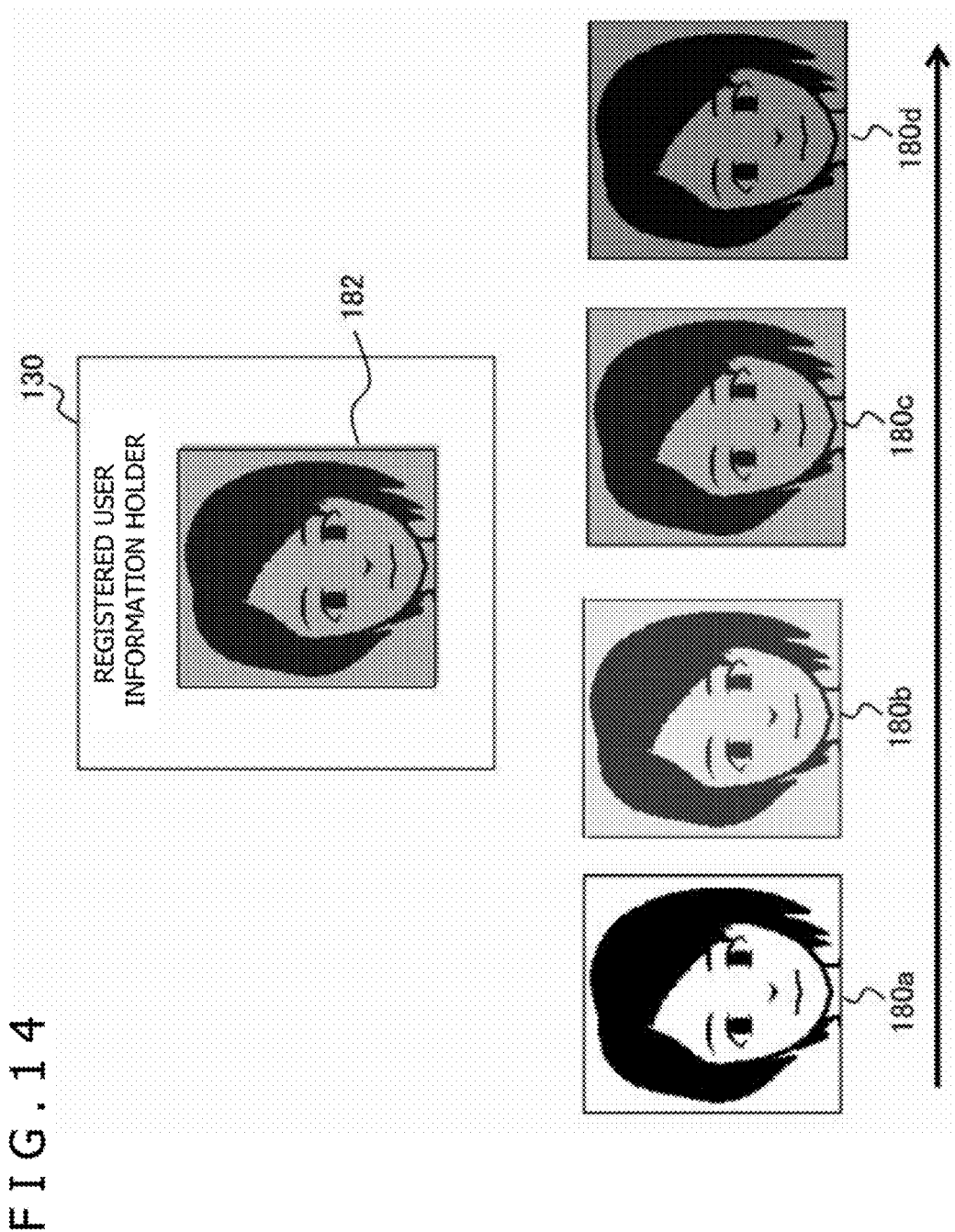
FIG. 14 is a diagram for explaining the basic adjustment operation of a shooting condition controller in the embodiment.

FIG. 14 is a diagram for explaining the basic adjustment operation of the shooting condition controller 106. First, the face identification data of a registered user is stored in the registered user information holder 130. The face identification data is stored in association with user identification information as shown in FIG. 8 in practice. Furthermore, the face identification data is presentationally shown as a face image 182 in FIG. 8 although being not necessarily the face image itself as described above. On the other hand, if a face region extracted from an image shot in login processing is e.g. a face image 180a, the luminance is totally different compared with the registered face image 182 and therefore there is a possibility that the authentication fails even though these face images are face images of the same user.

Therefore, the shooting condition controller 106 acquires the data of the face image 180a from the face authentication section 114 and decides the adjustment target of the shooting condition so that the image characteristics of the face image 180a may get close to the image characteristics of the face image 182 as the source of the face identification data. As the image characteristics, any parameter used in image analysis or an image processing technique may be employed. For example, any of the luminance distribution, the frequency distribution, the color distribution, the grayscale distribution, and so forth or a combination of them may be employed. Besides the image characteristics, characteristics of the figure in the image, such as the distribution of parts of the face, may be utilized. In the example of FIG. 14, the shutter speed and the diaphragm are adjusted and the gain is lowered in such a direction as to lower the exposure as shown by an arrow.

Then, the camera 7 is made to perform shooting with gradual change in the shooting condition by every predetermined amount so that the shooting condition may reach the decided target. At this time, every time a shot image is obtained, the degree of match between the face image thereof (e.g. face image 180b) and the registered face image 182 (or face identification data thereof) is checked, and the face image deemed to be shot under the optimum condition (e.g. face image 180c) is acquired. The path along which the shooting condition reaches the adjustment target is not limited to a one-direction path like that shown in FIG. 14 and the shooting condition may be brought closer to the target through swinging toward the higher and lower sides.

Alternatively, the plural face images 180b, 180c, and 180d in a predetermined condition range may be acquired at one time by bracket shooting and thereafter the optimum face image 180c may be selected. Furthermore, depending on the image characteristic on which attention is focused, the optimum shooting condition may be obtained by calculation without gradually changing the shooting condition. In this case, the amount of adjustment of the shooting condition is calculated in accordance with a calculation expression prepared in advance on the basis of the difference between the image characteristic of the face image 182 as the source of the face identification data and the image characteristic of the shot face image 180a, and a face image shot under the condition after the adjustment is employed. It will be understood by those skilled in the art that this calculation expression is variously given depending on the image characteristic.

Figure 15:
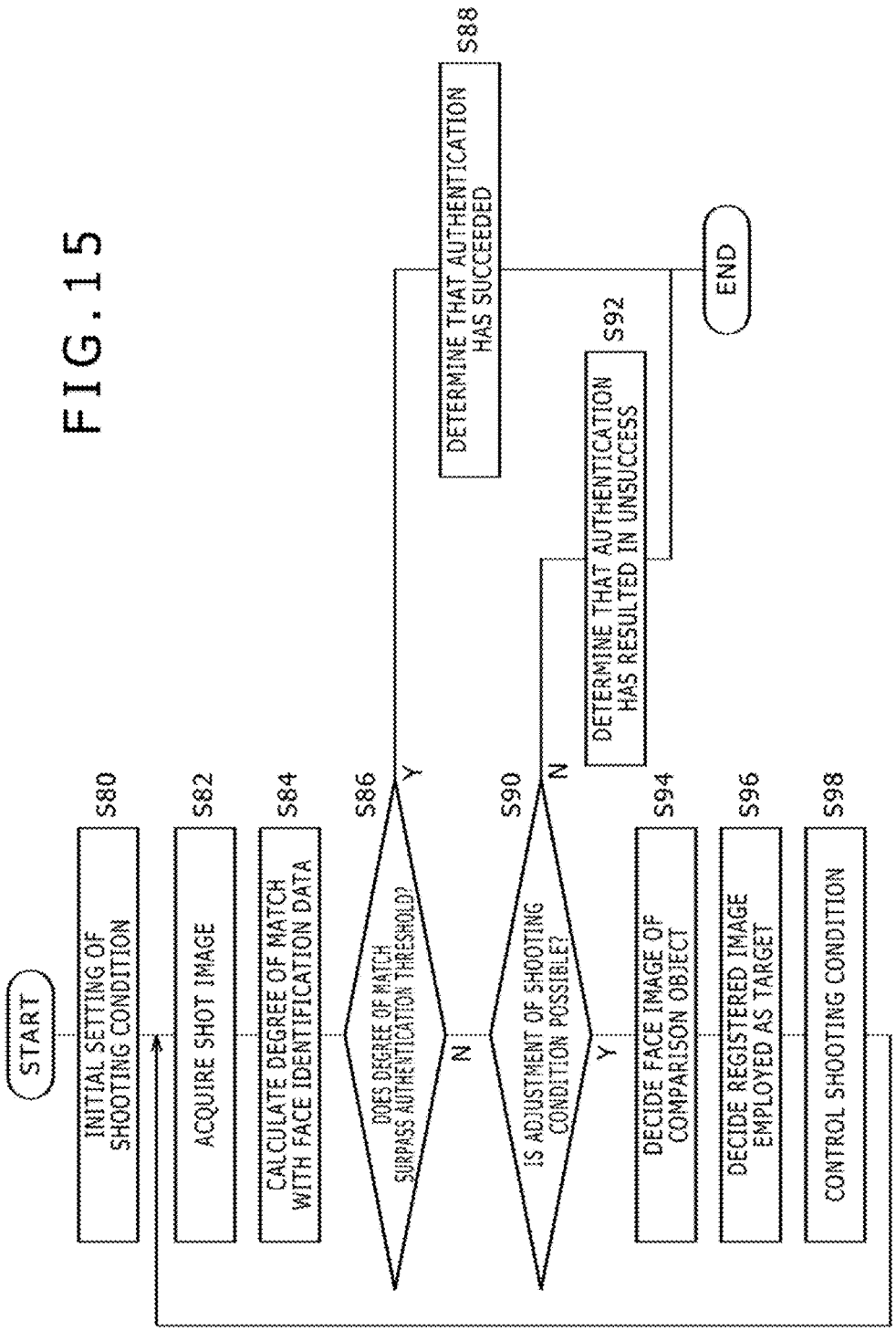
FIG. 15 is a flowchart showing the procedure of processing of carrying out face authentication by the face authentication section while adjusting the shooting condition of the camera by the shooting condition controller in the embodiment.

FIG. 15 is a flowchart showing the procedure of processing of carrying out face authentication by the face authentication section 114 while adjusting the shooting condition of the camera 7 by the shooting condition controller 106. Typically this processing is executed in the first-stage face authentication, which is the initial stage of shooting. However, this processing can be applied also to the second-stage face authentication. First, the camera 7 performs shooting under a condition in accordance with the initial setting and the face authentication section 114 acquires the shot image (S80 and S82). The shooting condition of this time may be decided by using a general automatic adjustment function possessed by the camera 7.

Next, the face authentication section 114 compares the feature data of an image of a face region extracted from the shot image with the face identification data of each registered user stored in the registered user information holder 130 and calculates the degree of match as described above (S84). Then, if the registered user about which the degree of match surpasses the authentication threshold exists (Y of S86), the face authentication section 114 determines that the authentication has succeeded without a problem and makes transition to the subsequent processing such as the second-stage face authentication and login processing (S88).

On the other hand, if the user whose degree of match surpasses the authentication threshold does not exist even though the face is detected (N of S86), the shooting condition controller 106 starts the processing of adjusting the shooting condition (Y of S90 and S94 to S98). Specifically, first if plural face images are extracted from the shot image, the shooting condition controller 106 decides a face image employed as the comparison object among them on the basis of a predetermined rule (S94). For example, the shooting condition controller 106 selects the face image from which the highest value is obtained as the degree of match calculated in S84. Alternatively, the shooting condition controller 106 may select the face image having the largest size of the face region, the face image estimated to be obtained by shooting the face closest to the camera 7, the face image at the position closest to the center of the shot image, or the like.

Next, the shooting condition controller 106 decides a face image employed as the target of image characteristic approximation among the face images of the registered face identification data on the basis of a predetermined rule (S96). For example, the shooting condition controller 106 selects any of the face image with the latest registration timing, the face image having a high frequency of surpassing of the authentication threshold in the past authentication processing, the face image having the highest degree of match with the face image of the comparison object decided in S94, the face image with a face orientation closest to that of the face image decided in S94, and so forth. Plural criteria may be employed as the selection rule. In the registered user information holder 130, information according to the employed criterion is stored as appropriate in association with the face identification data. Furthermore, the face image with which the degree of match has not surpassed a predetermined value in the past authentication processing may be excluded from the choices.

Next, the shooting condition controller 106 compares the face image of the comparison object decided in S94 in the shot image with the face image that is decided in S96 and is employed as the target on the basis of the image characteristic like the above-described one to thereby decide the adjustment target of the shooting condition and change the shooting condition of the camera 7 in accordance with the result of the decision (S98). Then, the face authentication section 114 acquires an image shot under the condition after the adjustment to thereby compare the feature data of an image of a face region with the face identification data of each registered user stored in the registered user information holder 130 again and calculate the degree of match (S84). If a user whose degree of match surpasses the authentication threshold is obtained through this process (Y of S86), the face authentication section 114 determines that the authentication has succeeded (S88).

If a user whose degree of match surpasses the authentication threshold does not exist (N of S86) and there is still room for adjustment in the shooting condition (Y of S90), the shooting condition controller 106 adjusts the shooting condition again (S94 to S98). It is also possible to omit the processing of S94 and S96 depending on the degree of match calculated in S84. Specifically, if the degree of match changes in the improvement direction, it is estimated that the policy of the adjustment decided first is correct and therefore only changing the shooting condition may be carried out with omission of the processing of S94 and S96.

If the degree of match does not change or is deteriorated, the face image of the comparison object and the face image employed as the target may be reselected in S94 and S96 or the adjustment target of the shooting condition may be changed in S98. Such adjustment of the shooting condition and authentication are repeated and, if a user whose degree of match surpasses the authentication threshold is obtained (Y of S86), the face authentication section 114 determines that the authentication has succeeded (S88). If the adjustment range of the shooting condition reaches a predetermined limit (N of S90) without obtainment of a user whose degree of match surpasses the authentication threshold (N of S86), possibly the login object is not the registered user and therefore the face authentication section 114 determines that the authentication has resulted in unsuccess and ends the processing (S92).

In the case of continuously shooting images while changing the shooting condition to a predetermined adjustment range by bracket shooting, authentication processing is executed in order of acquisition of the shot image in S84 and S86 and success and unsuccess of the authentication are determined on the basis of the shot image with which the highest degree of match is obtained. Furthermore, in the above-described example, when authentication of even one person succeeds, the adjustment of the shooting condition is not further carried out and the authentication processing is ended. However, while a face image about which authentication has not succeeded is left, the adjustment of the shooting condition may be continued as long as there is room for adjustment. In this case, any of the left face images is employed as the face image decided as the comparison object in S94. In this case, without selecting the face image based on the above-described criterion in S94, all face images may be used for the adjustment e.g. by sequentially employing the face images included in the shot image as the comparison object from an edge side. At this time, the authentication target may be limited to the face image used for this adjustment or other face images may also be regarded as the target of the authentication processing.

Furthermore, in the procedure shown in FIG. 15, the efficiency of the adjustment processing is sought by narrowing down the registered images employed as the target in S96 to one image. However, all registered images may be sequentially employed as the target and the shooting condition may be adjusted from various angles. That is, the registered face image is extracted to be employed as the target one by one in S96 and the shooting condition adjustment and the authentication processing in S98 and the subsequent steps are executed. In this case, if the adjustment range of the shooting condition reaches a predetermined limit (N of S90) without obtainment of a user whose degree of match surpasses the authentication threshold (N of S86), the next registered image is employed as the target, with the face image of the comparison object left unchanged, and the same processing is repeated. Then, the processing is ended when the authentication results in unsuccess even after the adjustment is carried out about all registered images.

Due to such adjustment processing, even when the image characteristics of an image shot at the time of login differ from the image characteristics of the registered face identification data because of change in the shooting environment such as illumination, it is possible to suppress the occurrence of an inconvenience that the authentication accuracy is deteriorated attributed to the difference and the user has difficulty in login. Furthermore, because the adjustment is carried out according to already-registered data, troublesome work of retrying shooting until data allowing proper authentication is obtained at the time of data registration is alleviated.

Therefore, for example if the adjustment processing is combined with the above-described automatic registration of face identification data, even when a registration object is decided comparatively easily, the deterioration of the authentication accuracy due to this can be prevented. Furthermore, in this case, an image shot through condition adjustment becomes the registration object and therefore the image characteristics of the registered data become uniform by themselves. As a result, obtainment of a high value as the degree of match with data of a correct user is facilitated and hence the authentication accuracy can be improved.

The present disclosure is described above based on the embodiment. It will be understood by those skilled in the art that this embodiment is exemplification and various modification examples are possible in combinations of the respective constituent elements and the respective processing processes thereof and such modification examples are also within the scope of the present disclosure.

For example, the target of use of the present embodiment is not limited to user login. Specifically, the present embodiment can be applied to any technique irrespective of the field and use purpose thereof as long as the technique is to carry out some kind of determination, discrimination, or detection by checking the degree of match between a registered image and a newly-acquired image. For example, the above-described data automatic registration technique and shooting condition adjustment technique can be applied even to a case of only identifying who or what a subject is, and effects similar to those described in the present embodiment can be obtained.

The present disclosure contains subject matter related to that disclosed in Japanese Priority Patent Application JP 2014-211057 filed in the Japan Patent Office on Oct. 15, 2014, the entire content of which is hereby incorporated by reference.

What is claimed is:

1. An information processing device comprising:
an image acquirer configured to acquire from an imaging device shot images of users;
a registered user information holder configured to hold, in association with each other, face identification data and facial characteristics data, from an image of a registered user's face;
a face authentication section configured to use the face identification data held in the registered user information holder to execute authentication processing of a face image in the shot images of users;
a shooting condition controller configured to determine a target face image in an image being shot of a user, and target facial characteristics data held by the registered user information holder, to adjust shooting conditions at the imaging device such as to maximize degree of match between characteristics of the target face image and the target facial characteristics data; and
an information processing section configured to execute information processing on a basis of an authentication result of a face image obtained by adjustment.

2. The information processing device according to claim 1, further comprising:
a face identification data registration section configured to update the face identification data on a basis of the face image obtained by adjustment when degree of match between the face image obtained by adjustment and the face identification data satisfies a predetermined condition.

3. The information processing device according to claim 1, wherein the shooting condition controller selects the target facial characteristics data from a plurality of pieces of facial characteristics data held by the registered user information holder on a basis of any of registration timing, frequency of success in authentication in past authentication processing, the degree of match with the face image in the shot images of users, and degree of similarity of a face orientation to the face image.

4. The information processing device according to claim 1, wherein the shooting condition controller sequentially sets a plurality of pieces of facial characteristics data held by the registered user information holder as the target facial characteristics data and adjusts the shooting conditions for making the imaging device perform shooting.

5. The information processing device according to claim 1, wherein the shooting condition controller selects a face image employed as the target face image from a plurality of face images in the shot images of users on a basis of any of the degree of match with the face identification data, area of a face region, distance of a face from the imaging device, and a position in the shot image.

6. The information processing device according to claim 1, wherein the shooting condition controller sequentially sets a plurality of face images in the shot images of users as the target face image and adjusts the shooting conditions for making the imaging device perform shooting.

7. The information processing device according to claim 1, wherein the shooting condition controller repeats adjustment of the shooting conditions until the degree of match between the face image and the face identification data surpasses a predetermined authentication threshold and authentication succeeds.

8. The information processing device according to claim 1, wherein the shooting condition controller makes the imaging device continuously perform shooting while changing the shooting conditions in a stepwise manner, and determines success and non-success in authentication by using a face image whose degree of match with the face identification data is highest among face images in a plurality of obtained shot images of users.

9. The information processing device according to claim 1, wherein the shooting condition controller decides amount of adjustment of the shooting conditions on a basis of difference between the target facial characteristics data and characteristics of the target face image in the image being shot of a user.

10. The information processing device according to claim 1, wherein the registered user information holder holds, as the facial characteristics data, at least one of luminance distribution, frequency distribution, color distribution, grayscale distribution, and facial feature distribution, in the image of the registered user's face.

11. The information processing device according to claim 1, wherein the shooting condition controller adjusts, as the shooting conditions, at least one of exposure, diaphragm, gamma value, white balance, shutter speed, and gain.

12. An information processing method comprising, by an information processing device:
  acquiring from an imaging device shot images of users;
  reading out registered-user face identification data and facial characteristics data stored associatively in a storage device and using the face identification data to carry out authentication of a face image in the shot images of users;
  reading out registered-user facial characteristics data stored in the storage device, determining a target face image in an image being shot of a user, and target facial characteristics data in the read-out facial characteristic data, and adjusting shooting conditions at the imaging device such as to maximize degree of match between characteristics of the target face image and the target facial characteristics data; and
  executing information processing on a basis of an authentication result of a face image obtained by adjustment.

13. A non-transitory computer-readable recording medium having embodied thereon a computer program product for a computer, comprising modules of:
  acquiring from an imaging device shot images of users;
  reading out registered-user face identification data and facial characteristics data stored associatively in a storage device and using the face identification data to carry out authentication of a face image in the shot images of users;
  reading out registered-user facial characteristics data stored in the storage device, determining a target face image in an image being shot of a user, and target facial characteristics data in the read-out facial characteristic data, and adjusting shooting conditions at the imaging device such as to maximize degree of match between characteristics of the target face image and the target facial characteristics data; and
  executing information processing on a basis of an authentication result of a face image obtained by adjustment.

* * * * *